United States Patent
Kumar et al.

(10) Patent No.: US 10,652,691 B2
(45) Date of Patent: May 12, 2020

(54) OPTIMIZED POSITIONING METHOD FOR MOBILE DEVICES

(71) Applicant: QUALCOMM Incorporated, San Diego, CA (US)

(72) Inventors: Akash Kumar, Hyderabad (IN); Nilotpal Dhar, Hyderabad (IN); Amit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/041,132

(22) Filed: Jul. 20, 2018

(65) Prior Publication Data

US 2020/0029165 A1 Jan. 23, 2020

(51) Int. Cl.
*H04W 24/00* (2009.01)
*H04W 4/02* (2018.01)
(Continued)

(52) U.S. Cl.
CPC .............. *H04W 4/02* (2013.01); *H04W 48/16* (2013.01); *H04M 1/72519* (2013.01);
(Continued)

(58) Field of Classification Search
CPC ......... H04W 4/02; H04W 48/16; H04W 4/22; H04W 4/025; H04W 4/90; H04W 4/33;
(Continued)

(56) References Cited

U.S. PATENT DOCUMENTS

| 2014/0219162 A1* | 8/2014 | Eyuboglu | H04W 16/26 370/315 |
| 2014/0235271 A1* | 8/2014 | Jung | H04W 64/00 455/456.1 |

(Continued)

FOREIGN PATENT DOCUMENTS

| EP | 3099089 A1 | 11/2016 |
| WO | 2012099517 A1 | 7/2012 |
| WO | 2018033260 A1 | 2/2018 |

OTHER PUBLICATIONS

Andreas H., et al., "Overview of 3GPP Release 14 Enhanced NB-IoT", IEEE Network, IEEE Service Center, New York, NY, US, vol. 31, No. 6, Nov. 1, 2017 (Nov. 1, 2017), pp. 16-22, XP011673459, ISSN: 0890-8044, DOI:10.1109/MNET.2017.1700082, [retrieved on Nov. 27, 2017].

(Continued)

*Primary Examiner* — Danh C Le
(74) *Attorney, Agent, or Firm* — Hunter Clark PLLC

(57) ABSTRACT

Techniques for determining a position of a mobile device are provided. A method according to these techniques includes obtaining assistance data comprising information for cells associated with a plurality of wireless transmitters of a wireless communications network based on the coarse location of the mobile device, selecting a plurality of the cells from the assistance data, wherein selecting the plurality of cells includes identifying sets of colocated cells and selecting one cell from each of the colocated sets of cells; measuring signals from the plurality of cells to generate (Continued)

positioning signal measurements; and sending the positioning signal measurements to a location server. A colocated set of cells may include a narrowband cell and a non-narrowband cell, and the narrowband wireless cell may comprise a narrowband Internet of Things (NB-IoT) cell and a non-narrowband cell colocated with the NB-IoT cell at an Evolved Node B (eNodeB).

14 Claims, 12 Drawing Sheets

(51) Int. Cl.
*H04W 48/16* (2009.01)
*H04W 88/02* (2009.01)
*H04M 1/725* (2006.01)
*H04W 4/90* (2018.01)

(52) U.S. Cl.
CPC .......... *H04M 1/72522* (2013.01); *H04W 4/90* (2018.02); *H04W 88/02* (2013.01)

(58) Field of Classification Search
CPC .... H04W 88/02; G01C 5/06; H04M 1/72519; H04M 1/72522
USPC .................. 455/456.1, 456.6, 550.1, 456.5
See application file for complete search history.

(56) References Cited

U.S. PATENT DOCUMENTS

| | | | |
|---|---|---|---|
| 2014/0274160 A1* | 9/2014 | Xiao | H04W 64/00 455/456.5 |
| 2014/0349677 A1* | 11/2014 | Xiao | H04W 4/02 455/456.1 |
| 2015/0018010 A1* | 1/2015 | Fischer | H04W 4/023 455/456.2 |
| 2015/0139195 A1* | 5/2015 | Xiao | H04W 36/22 370/332 |
| 2016/0234644 A1* | 8/2016 | Belghoul | G01C 5/06 |
| 2016/0373971 A1* | 12/2016 | Kulal | H04W 24/02 |
| 2018/0139763 A1* | 5/2018 | Bitra | H04L 5/0048 |
| 2018/0220342 A1* | 8/2018 | Farooqi | H04W 36/00835 |
| 2018/0368046 A1* | 12/2018 | Zhang | H04W 16/32 |
| 2018/0368196 A1* | 12/2018 | Gage | H04W 76/12 |
| 2018/0376531 A1* | 12/2018 | Martinez Tarradell | H04W 76/27 |
| 2019/0132786 A1* | 5/2019 | Sundberg | H04W 48/12 |
| 2019/0174472 A1* | 6/2019 | Lee | H04L 1/1812 |
| 2019/0182614 A1* | 6/2019 | Monogioudis | G01S 5/0294 |
| 2019/0253998 A1* | 8/2019 | Johansson | H04W 64/00 |

OTHER PUBLICATIONS

International Search Report and Written Opinion—PCT/US2019/041194—ISA/EPO—dated Sep. 25, 2019.

* cited by examiner

605

Select the one cell responsive to the one cell operating at a same frequency as a serving cell associated with the mobile device

Select the one cell of a respective one of the colocated sets of cells responsive to the one cell experiencing a least amount of interference from one or more active aggressors relative to other cells of the respective one of the colocated sets of cells

Select the one cell responsive to the one cell operating transmitting positioning reference signals more frequently per positioning occasion relative to other cells of the respective one of the colocated sets of cells

*FIG. 8*

Utilizing single Resource Block (180 kHz) within a normal LTE carrier

OPTIMIZED POSITIONING METHOD FOR MOBILE DEVICES

BACKGROUND

The proliferation of location-based services available to mobile devices has created a need for efficient positioning methods that can be used to determine the locations of these mobile devices. Mobile devices can measure signals received from wireless transmitters, such as base stations and/or wireless access points. These signal measurements can be used by the mobile device and/or a location server associated with the wireless network to determine the location of the mobile device.

SUMMARY

An example method for determining a position of a mobile device according to the disclosure includes obtaining assistance data comprising information for a plurality of cells associated with wireless transmitters of a wireless communications network proximate to the mobile device; selecting a subset of the plurality of the cells from the assistance data, wherein selecting the subset of the plurality of the cells includes identifying colocated sets of cells and selecting one cell from each of the colocated sets of cells; measuring signals from the subset of the plurality of the cells to generate positioning signal measurements; and obtaining a position of the mobile device based on the positioning signal measurements.

Implementations of such a method can include one or more of the following features. Sending the positioning signal measurements to a location server and obtaining the position of the mobile device from the location server. A colocated set of cells comprises a narrowband cell and a non-narrowband cell. The narrowband cell comprises a narrowband Internet of Things (NB-IoT) cell and the non-narrowband cell is colocated with the NB-IoT cell at an Evolved Node B (eNodeB). Selecting the one cell from each of the colocated sets of cells includes selecting the one cell responsive to the one cell operating at a same frequency as a serving cell associated with the mobile device. Selecting the one cell from each of the colocated sets of cells further includes selecting the one cell of a respective one of the colocated sets of cells responsive to the one cell experiencing a least amount of interference from one or more active aggressors relative to other cells of the respective one of the colocated sets of cells. Selecting the one cell from each of the colocated sets of cells includes selecting the one cell responsive to the one cell transmitting positioning reference signals more frequently per positioning occasion relative to other cells of the respective one of the colocated sets of cells. Identifying the colocated sets of cells includes obtaining operating mode information from the subset of the plurality of the cells and identifying the colocated sets of cells based on the operating mode information. The operating mode information comprises a Master Information Block transmitted by each of the cells. Generating a cell list by adding standalone cells to the beginning of the cell list and adding the one cell from each of the colocated sets of cells to the cell list following the standalone cells. Measuring the signals from the subset of the plurality of the cells to generate the positioning signal measurements includes measuring the signals from the subset of the plurality of the cells according to order in which the subset of the plurality of the cells appear in the cell list.

An example mobile device according to the disclosure includes a transceiver for sending a receiving data wirelessly; a memory; and a processor communicatively coupled to the transceiver and the memory. The process is configured to obtain assistance data comprising information for a plurality of cells associated with wireless transmitters of a wireless communications network proximate to the mobile device; select a subset of the plurality of the cells from the assistance data, wherein the processor is further configured to identify colocated sets of cells and select one cell from each of the colocated sets of cells; measure signals from the subset of the plurality of the cells to generate positioning signal measurements; and obtain a position of the mobile device based on the positioning signal measurements.

Implementations of such a mobile device can include one or more of the following features. The processor is further configured to send the positioning signal measurements to a location server and to obtain a position of the mobile device from the location server. A colocated set of cells comprises a narrowband cell and a non-narrowband cell. The narrowband cell comprises a narrowband Internet of Things (NB-IoT) cell and the non-narrowband cell is colocated with the NB-IoT cell at an Evolved Node B (eNodeB). The processor being configured to select the one cell from each of the colocated sets of cells is further configured to select the one cell responsive to the one cell operating at a same frequency as a serving cell associated with the mobile device. The processor being configured to select the one cell from each of the colocated sets of cells is further configured to select the one cell of a respective one of the colocated sets of cells responsive to the one cell experiencing a least amount of interference from one or more active aggressors relative to other cells of the respective one of the colocated sets of cells. The processor being configured to select the one cell from each of the colocated sets of cells is further configured to select the one cell responsive to the one cell transmitting positioning reference signals more frequently per positioning occasion relative to other cells of the respective one of the colocated sets of cells. The processor being configured to identify the colocated sets of cells is further configured to obtain operating mode information from the subset of the plurality of the cells and identify the colocated sets of cells based on the operating mode information. The operating mode information comprises a Master Information Block transmitted by each of the cells. The processor is further configured to generate a cell list by adding standalone cells to the beginning of the cell list and adding the one cell from each of the colocated sets of cells to the cell list following the standalone cells. The processor being configured to measure the signals from the subset of the plurality of the cells to generate the positioning signal measurements is further configured to measure the signals from the subset of the plurality of the cells according to order in which the subset of the plurality of the cells appear in the cell list.

An example mobile device according to the disclosure includes means for obtaining assistance data comprising information for a plurality of cells associated with wireless transmitters of a wireless communications network proximate to the mobile device; means for selecting a subset of the plurality of the cells from the assistance data, wherein the means for selecting the subset of the plurality of the cells includes means for identifying colocated sets of cells and means for selecting one cell from each of the colocated sets of cells; means for measuring signals from the subset of the plurality of the cells to generate positioning signal measurements; and means for obtaining a position of the mobile device based on the positioning signal measurements.

Implementations of such a mobile device can include one or more of the following features. The mobile device includes means for sending the positioning signal measurements to a location server and means for obtaining a position of the mobile device from the location server. A colocated set of cells comprises a narrowband cell and a non-narrowband cell. The narrowband cell comprises a narrowband Internet of Things (NB-IoT) cell and the non-narrowband cell is colocated with the NB-IoT cell at an Evolved Node B (eNodeB).

An example non-transitory, computer-readable medium, having stored thereon computer-readable instructions for determining a position of a mobile device, according to disclosure includes instructions configured to obtain assistance data comprising information for a plurality of cells associated with wireless transmitters of a wireless communications network proximate to the mobile device; select a subset of the plurality of the cells from the assistance data, wherein selecting the subset of the plurality of the cells comprise instructions configured to cause the mobile device to identify colocated sets of cells and selecting one cell from each of the colocated sets of cells; measure signals from the subset of the plurality of the cells to generate positioning signal measurements; and obtain a position of the mobile device based on the positioning signal measurements.

Implementation of such a non-transitory, computer-readable medium can include one or more of the following features. The computer-readable medium can include instructions configured to cause the mobile device to send the positioning signal measurements to a location server and to obtain the position of the mobile device from the location server. A colocated set of cells comprises a narrowband cell and a non-narrowband cell. The narrowband cell comprises a narrowband Internet of Things (NB-IoT) cell and the non-narrowband cell is colocated with the NB-IoT cell at an Evolved Node B (eNodeB).

An example method for providing assistance data for determining a location of a mobile device according to the disclosure includes receiving a location request for the location of the mobile device; identifying a plurality cells proximate to the mobile device; identifying colocated sets of cells of the plurality of cells; generating optimized assistance data for the mobile device; and sending the optimized assistance data to the mobile device.

Implementations of such a method can include one or more of the following features. The location request comprises a coarse location for the mobile device. Determining a coarse location of the mobile device responsive to receiving the location request. Receiving signal measurement information from the mobile device based on the optimized assistance data; determining the location of the mobile device based on the signal measurement information; and sending a location response comprising the location of the mobile device. Generating the optimized assistance data for the mobile device include selecting one cell from each of the colocated sets of cells. Adding the selected one cell from each of the colocated sets of cells and standalone cells from the plurality of cells to the optimized assistance data. Identifying the colocated sets of cells includes requesting operating mode information from the plurality of cells indicating whether each of the plurality of cells is colocated with another cell; and receiving the operating mode information from the plurality of cells. Requesting the operating mode information from the plurality of cells includes requesting the operating mode information using a Long-Term Evolution (LTE) Positioning Protocol (LPPa) function for obtaining the operating mode information. Selecting the one cell from each of the colocated sets of cells includes selecting the one cell responsive to the one cell operating at a same frequency as a serving cell associated with the mobile device. Selecting the one cell from each of the colocated sets of cells includes selecting the one cell of a respective one of the colocated sets of cells responsive to the one cell experiencing a least amount of interference from one or more active aggressors relative to other cells of the respective one of the colocated sets of cells. Selecting the one cell from each of the colocated sets of cells includes selecting the one cell responsive to the one cell transmitting positioning reference signals more frequently per positioning occasion relative to other cells of the respective one of the colocated sets of cells. A colocated set of cells comprises a narrowband cell and a non-narrowband cell. The narrowband cell comprises a narrowband Internet of Things (NB-IoT) cell and the non-narrowband cell is colocated with the NB-IoT cell at an Evolved Node B (eNodeB).

An example computing device comprising a network interface; a memory; and a processor communicatively coupled to the network interface and the memory. The location request comprises a coarse location for the mobile device. The processor is configured to receive a location request for a location of a mobile device via the network interface; identify a plurality cells proximate to the mobile device; generate optimized assistance data for the mobile device; and send the optimized assistance data to the mobile device via the network interface.

Implementation of such a computing device can include one or more of the following features. The processor is configured to determine a coarse location of the mobile device responsive to receiving the location request. The processor is configured to receive signal measurement information from the mobile device based on the optimized assistance data; determine the location of the mobile device based on the signal measurement information; and send a location response comprising the location of the mobile device. The processor is configured to generate the optimized assistance data for the mobile device which includes selecting one cell from each of the colocated sets of cells. The processor is configured to add the selected one cell from each of the colocated sets of cells and standalone cells from the plurality of cells to the optimized assistance data. The processor is configured to identify the colocated sets of cells which includes requesting operating mode information from the plurality of cells indicating whether each of the plurality of cells is colocated with another cell; and receiving the operating mode information from the plurality of cells. The processor is configured to requesting the operating mode information from the plurality of cells which includes requesting the operating mode information using a Long-Term Evolution (LTE) Positioning Protocol (LPPa) function for obtaining the operating mode information. The processor is configured to selecting the one cell from each of the colocated sets of cells which includes selecting the one cell responsive to the one cell operating at a same frequency as a serving cell associated with the mobile device. The processor is configured to selecting the one cell from each of the colocated sets of cells which includes selecting the one cell of a respective one of the colocated sets of cells responsive to the one cell experiencing a least amount of interference from one or more active aggressors relative to other cells of the respective one of the colocated sets of cells. The processor is configured to select the one cell from each of the colocated sets of cells which includes selecting the one cell responsive to the one cell transmitting positioning reference signals more frequently per positioning occasion relative to other cells of the respective one of the colocated sets of cells. A colocated set of cells comprises a narrowband cell and a non-narrowband cell. The narrowband cell comprises a narrowband Internet of Things (NB-IoT) cell and the non-narrowband cell is colocated with the NB-IoT cell at an Evolved Node B (eNodeB).

An example computing device according to the disclosure includes means for receiving a location request for a location of the mobile device; means for identifying a plurality cells proximate to the mobile device; means for generating optimized assistance data for the mobile device; and means for sending the optimized assistance data to the mobile device.

Implementations of such a computing device can include one or more of the following features. The location request comprises a coarse location for the mobile device. Means for determining the coarse location of the mobile device responsive to receiving the location request. Means for receiving signal measurement information from the mobile device based on the assistance data; means for determining a location of the mobile device based on the signal measurement information; and means for sending a location response comprising the location of the mobile device. The means for generating the optimized assistance data for the mobile device includes: means for identifying colocated sets of cells of the plurality of cells; and means for selecting one cell from each of the colocated sets of cells. Means for adding the selected one transmitter from each of the colocated set of cells and standalone cells from the plurality of cells to the assistance data. The means for identifying the colocated sets of cells includes means for requesting operating mode information from the plurality of cells indicating whether each of the plurality of cells is colocated with another cell; and means for receiving the operating mode information from the plurality of cells. The means for requesting the operating mode information from the plurality of cells includes means for requesting the operating mode information using a Long-Term Evolution (LTE) Positioning Protocol (LPPa) function for obtaining operating mode information. The means for selecting the one cell from each of the colocated sets of cells includes means for selecting the one cell responsive to the one cell operating at a same frequency as a serving cell associated with the mobile device. The means for selecting the one cell from each of the colocated sets of cells includes means for selecting the one cell of a respective one of the colocated sets of cells responsive to the one cell experiencing a least amount of interference from one or more active aggressors relative to other cells of the respective one of the colocated sets of cells. Selecting the one cell from each of the colocated sets of cells includes means for selecting the one cell responsive to the one cell transmitting positioning reference signals more frequently per positioning occasion relative to other cells of the respective one of the colocated sets of cells. A colocated set of cells comprises a narrowband cell and a non-narrowband cell. The narrowband cell comprises a narrowband Internet of Things (NB-IoT) cell and the non-narrowband cell comprises a non-narrowband cell colocated with the NB-IoT cell at an Evolved Node B (eNodeB).

An example non-transitory, computer-readable medium, having stored thereon computer-readable instructions for determining a position of a mobile device, according to the disclosure includes instructions configured to cause a computing device to: receive a location request for a location of the mobile device; identify a plurality cells proximate to the mobile device; generate optimized assistance data for the mobile device; and send the optimized assistance data to the mobile device.

The location request comprises a coarse location for the mobile device. Instructions configured to cause the computing device to determine the coarse location of the mobile device responsive to receiving the location request. Instructions configured to cause the computing device to receive signal measurement information from the mobile device based on the assistance data; determine a location of the mobile device based on the signal measurement information; and send a location response comprising the location of the mobile device. The instructions configured to cause the computing device to generate the optimized assistance data for the mobile device include instructions configured to cause the computing device to identify colocated sets of cells of the plurality of cells; and select one cell from each of the colocated sets of cells. Instructions configured to cause the computing device to add the selected one transmitter from each of the colocated set of cells and standalone cells from the plurality of cells to the assistance data. The instructions configured to cause the computing device to identify the colocated sets of cells include instructions configured to cause the computing device to request operating mode information from the plurality of cells indicating whether each of the plurality of cells is colocated with another cell; and receive the operating mode information from the plurality of cells. The instructions configured to cause the computing device to request the operating mode information from the plurality of cells include instructions configured to cause the computing device to request the operating mode using a Long-Term Evolution (LTE) Positioning Protocol (LPPa) function for obtaining operating mode information. The instructions configured to cause the computing device to select the one cell from each of the colocated sets of cells include instructions configured to cause the computing device to select the one cell responsive to the one cell operating at a same frequency as a serving cell associated with the mobile device. The instructions configured to cause the computing device to select the one cell from each of the colocated sets of cells include instructions configured to cause the computing device to select the one cell of a respective one of the colocated sets of cells responsive to the one cell experiencing a least amount of interference from one or more active aggressors relative to other cells of the respective one of the colocated sets of cells. The instructions configured to cause the computing device to select the one cell from each of the colocated sets of cells include instructions configured to cause the computing device to select the one cell responsive to the one cell transmitting positioning reference signals more frequently per positioning occasion relative to other cells of the respective one of the colocated sets of cells. A colocated set of cells comprises a narrowband cell and a non-narrowband cell. The narrowband cell comprises a narrowband Internet of Things (NB-IoT) cell and the non-narrowband cell comprises a non-narrowband cell colocated with the NB-IoT cell at an Evolved Node B (eNodeB).

BRIEF DESCRIPTION OF THE DRAWING

FIG. 6 is a flow diagram of an example process for selecting a colocated cell from a set of colocated cells according to the disclosure.

FIG. 7 is a flow diagram of an example process for selecting a colocated cell from a set of colocated cells according to the disclosure.

FIG. 8 is a flow diagram of an example process for selecting a colocated cell from a set of colocated cells according to the disclosure.

Like reference symbols in the various drawings indicate like elements, in accordance with certain example implementations.

DETAILED DESCRIPTION

Techniques for determining a position of a mobile device are provided. The techniques disclosed herein can be used in positioning methods in which the mobile device uses assistance data obtained from the wide area network (WAN) to facilitate measurement of signals transmitted by cells of wireless transmitters proximate to the mobile device. The mobile device may then utilize the signal measurements to determine a location of the mobile device or may send the signal measurements to a location server which can determine the location of the mobile device based on the signal measurements.

The techniques disclosed herein can be used in situations where more than one cell is colocated at the same location. In some implementations, a NarrowBand-Internet of Things (NB-IoT) cell may be colocated with one or more non-narrowband Long-Term Evolution (LTE) cells at the same Enhanced Node B (eNodeB). In other implementations, more than one NB-IoT cell may be collocated, and the narrowband cells may be associated with different wireless carriers. Measurement of signals from more than one cell at the same location is time and resource consuming and provides no additional benefit with respect to the determining the location of the mobile device. The techniques disclosed herein provide means for identifying such colocated cells and for selecting one cell from the set of colocated cells for the purposes of position determination. The techniques disclosed herein can be implemented by the mobile device or may be implemented on the network by the location server and/or other network-based entities.

Figure 1:
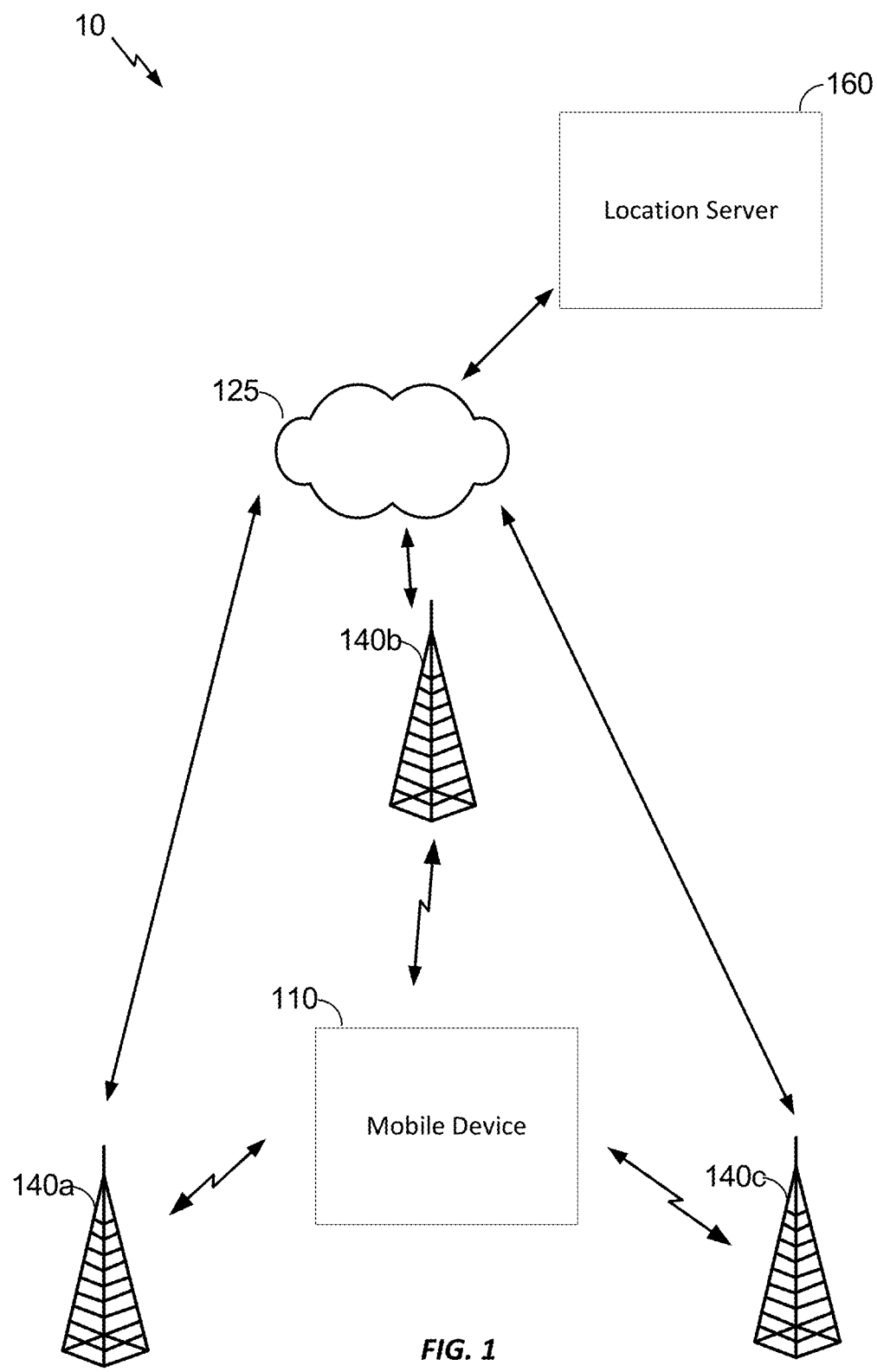
FIG. 1 is a diagram of an example operating environment in which the techniques disclosed here can be implemented according to the disclosure.

FIG. 1 is an example operating environment in which the techniques disclosed herein can be implemented. The example operating environment includes a mobile device 110, a location server 160, a network 125, and wireless transmitters 140. The example implementation includes three wireless transmitters 140a, 140b, and 140c. The number of wireless transmitters in an actual implementation may vary, and the network may comprise one or more components that have been omitted for the sake of clarity.

The mobile device 110 can be various types of computing devices, including but not limited to, a laptop or other personal computer systems, a tablet computer, a mobile phone, a smartphone, a game console, a wearable device (e.g., a smartwatch, head-mounted device, etc.) and/or other types of computing device. The mobile device 110 may be referred to as a user equipment (UE), mobile station, mobile terminal, or other similar term depending upon the particular implementation of the operating environment and the type of network 125 implemented therein.

The network 125 can comprise a wide area network (WAN) which can include the wireless transmitters 140 and the location server 160. In some implementations, the network 125 can implement the LTE high-speed wireless communications protocols, and at least a portion of the wireless transmitters may support the NB-IOT protocols. However, the techniques disclosed herein may be utilized with wireless networks that implement other types of wireless communications protocols.

The mobile device 110 can be configured to receive assistance data from the location server 160 to assist in determining the location of the mobile device. The mobile device 110 can be configured to execute a position determination procedure at the mobile device 110 to determine a location of the mobile device 110 using the assistance data obtained from the location server 160. In other implementations, a network-based position determination procedure can be performed where the position of the mobile device 110 is determined by the location server 160.

The location server 160 can be implemented by one or more computing device that are associated with the network 125. In LTE implementations, the location server 160 can comprise an Evolved Serving Mobile Location Center (E-SMLC) or a Secure User Plane Location (SUPL) Location Platform (SLP).

The wireless transmitters 140 are configured to transmit wireless signals that can be used by the mobile device 110 and/or the location server 160 to determine a location of the mobile device. The locations of the wireless transmitters 140 are known to the network and can be used by the mobile device 110 and/or the location server 160 to determine the location of the mobile device 110 by measuring signals from the wireless transmitters 140 at the mobile device 110. The wireless transmitters 140 can be base stations capable of two-way communication with the mobile device 110 and other such devices capable of wireless communication and can be Evolved Node Bs (eNodeBs) where the network 125 is an LTE network. Each wireless transmitter of the wireless transmitters 140 can support one or more cells and each cell can be associated with a unique cell identifier.

The mobile device 110 and the location server 160 can be configured to facilitate Observed Time Difference of Arrival (OTDOA) positioning. OTDOA is a downlink positioning method that can be used in Long-Term Evolution (LTE) network implementations. In OTDOA, the times of arrival (TOAs) of signals from several eNodeBs located proximate to the mobile device are subtracted from the TOA of a signal received from a reference eNodeB to form Observed Time Difference of Arrival (OTDOAs). Ideally, at least three timing measurements from geographically dispersed eNodeBs that have good geometry relative to one another and the mobile device are needed to determine the location of the mobile device using OTDOA. The mobile device 110 can be configured to obtain signals from eNodeBs that are associated with more than one carrier. The mobile device 110 can be configured to use signals from eNodeBs associated with a different carrier from that which the mobile device 110 is associated, and the mobile device 110 may not be able to connect with or otherwise establish a communication session with such an eNodeB associated with another carrier.

In OTDOA, the mobile device 110 is configured to perform Reference Signal Time Difference Measurements (RSTD) and to send the RSTD measurement information (also referred to herein as "positioning signal measurement information") to the location server 160. The RSTD represents a relative timing difference between two cells, a reference cell and a measured cell, as observed by the mobile device 110. The mobile device 110 can select one or more of the cells included in the assistance data received from the location server 160 from which to obtain RSTD measurements. The location server 160 can provide the assistance data to the mobile device 110 based on a coarse location of the mobile device. The location server 160 can include information identifying cells associated with wireless transmitters 140 proximate to the coarse location of the mobile device 110. In some implementations, the mobile device 110 can be configured to determine a coarse location of the mobile device 110 and to send the coarse location to the location server. For example, the mobile device 110 can send a serving cell identifier or other information identifying a wireless transmitter that is proximate to the mobile device 110. In other implementations, the location server 160 can determine a coarse location for the mobile device based on a serving cell identifier or other information obtained from the eNodeB or other network entity providing services to the mobile device.

The mobile device 110 can obtain RSTD measurements from cells of the wireless transmitters 140 that are identified in the assistance data provided by the location server 160. The assistance data can include reference cell information associated with a cell of one of the wireless transmitters 140 that is to serve as the reference cell in the OTDOA calculations. The assistance data can also include neighbor cell information identifying the neighbor cells that may be used in the OTDOA calculations. The assistance data can include Positioning Reference Signal (PRS) information that identifies the PRS configuration of each of the cells included in the assistance data. The neighbor cell information can also include an expected RSTD value that specifies the RSTD value that the mobile device 110 is expected measure between the respective neighbor cell and the assistance data reference cell. The neighbor cell information can also include an expected RSTD uncertainty value that specifies an uncertainty in the RSTD value for a particular neighbor cell.

In a control plane solution, such as SUPL, the location server 160 may receive a request for the position of the mobile device from another entity (not shown) that is configured to receive requests for a location-based service associated with the mobile device 110. For example, the other entity may be a Mobility Management Entity (MME) which receives a request for a location service associated with the mobile device (e.g. from the mobile device itself or from yet another entity, such as a Gateway Mobility Location Center (GMLC)). In some instances, the MME may also initiate a request for location services to the location server 160 in certain situations, such as in response to an emergency call being placed by the mobile device 110. The location server 160 can provide the location that the location server 160 has determined for the mobile device 110 to the requesting entity, e.g. the MME, GMLC, the mobile device itself, or another mobile device.

The techniques disclosed herein can be used with NarrowBand-Internet of Things (NB-IoT) protocols which is a Low Power WAN (LPWAN) wireless communication technology developed to facilitate IoT devices and services. NB-IoT is based on a subset of the LTE wireless protocol standards discussed above. The NB-IoT devices may be deployed in a wide variety of operating environments, including indoor and outdoor environments. NB-IoT is designed to provide power consumption of the IoT devices, improved system capacity and spectrum efficiency, and low-cost implementations.

Some mobile devices, such as the mobile device 110, may be configured to support conventional LTE communication protocols and the NB-IoT protocols. Accordingly, OTDOA positioning could be performed by measuring signals from cells that include narrowband Internet of Things (NB-IOT) cells and non-narrowband conventional LTE cells. In some instances, both an NB-IoT cell and a non-NB IoT cell may be colocated at the same eNodeB. In some instance, multiple NB-IoT cells may be colocated at the same location, and each NB-IoT may be associated with different carriers. The assistance data received by the mobile device 110 may include the colocated cells. The mobile device 110 may not be able to measure all of the neighboring cells that are included in the assistance data provided by the location server 160, and the location server 160 can specify a timeout period for completing the RSTD measurements. Obtaining measurements from more than one colocated eNodeB is not useful for positioning purposes, since the colocated cells are located at the same location relative to the mobile device. Obtaining signals from cells that are geographically dispersed about the location of the mobile device 110 is more useful for position determination. Accordingly, the mobile device 110 can be configured to prioritize standalone NB-IoT cells and to obtain measurements from the standalone cells first. The mobile device 110 can also be configured to select one cell from each set of colocated cells and to obtain measurements from as many of the selected colocated cells as possible before the timeout period for obtaining such measurements elapses.

The mobile device 110 can select either an NB-IoT cell or the non-narrowband cell colocated at a particular location where narrowband and non-narrowband cells are colocated or select an NB-IoT cell where multiple narrowband cells are colocated. The mobile device 110 can be configured to select which cell from the colocated cells to select based on one or more of the following criteria: (1) select the cell from the colocated cells based on which cell (if any) has the same inter-frequency type as the current serving cell associated with the mobile device (i.e., is operating at the same frequency as a serving cell currently associated with the mobile device) so that the mobile device does not have to spend time re-tuning the receiver; (2) select the cell from the colocated cells experiencing a last amount of interference from one or more aggressors relative to the other colocated cells; and (3) select the cell from the colocated cells transmitting PRS signals the most frequently.

Figure 2:
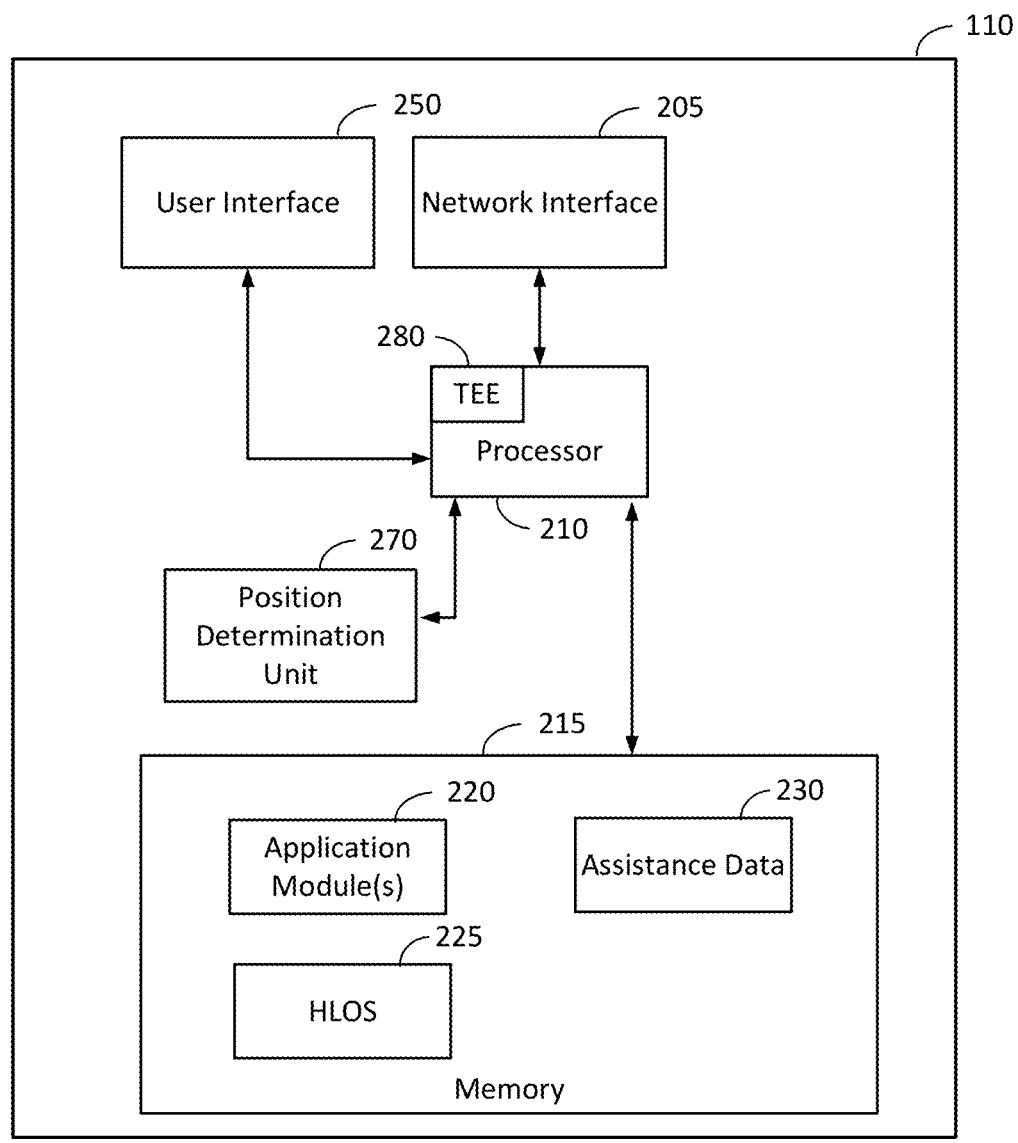
FIG. 2 is a block diagram of an example computing device that can be used to implement the mobile device illustrated in the preceding example according to the disclosure.

FIG. 2 is a functional block diagram of an example computing device 200 that can be used to implement the mobile device 110 discussed in the preceding example implementation. For the sake of simplicity, the various features/components/functions illustrated in the schematic boxes of FIG. 2 can be connected together using a common bus or are can be otherwise operatively coupled together. Other connections, mechanisms, features, functions, or the like, may be provided and adapted as necessary to operatively couple and configure a computing device 200. Furthermore, one or more of the features or functions illustrated in the example of FIG. 2 may be further subdivided, or two or more of the features or functions illustrated in FIG. 2 may be combined. Additionally, one or more of the features or functions illustrated in FIG. 2 may be excluded.

As shown, the computing device 200 can include a network interface 205 that can be configured to provide wired and/or wireless network connectivity to the computing device 200. The network interface can include one or more local area network transmitters, receivers, and/or transceivers that can be connected to one or more antennas (not shown). The one or more local area network transmitters, receivers, and/or transceivers comprise suitable devices, circuits, hardware, and/or software for communicating with and/or detecting signals to/from one or more of the wireless local area network (WLAN) access points, and/or directly with other wireless computing devices within a network. The network interface 205 can also include, in some implementations, one or more wide area network transmitters, receivers, and/or transceivers that can be connected to the one or more antennas (not shown). The wide area network transmitters, receivers, and/or transceivers can comprise suitable devices, circuits, hardware, and/or software for communicating with and/or detecting signals from one or more of, for example, the wireless wide area network (WWAN) access points (such as the wireless transmitters 140) and/or directly with other wireless computing devices within a network. The network interface 205 can include a wired network interface in addition to one or more of the wireless network interfaces discussed above. The network interface 205 can be used to receive data from and send data to one or more other network-enabled devices via one or more intervening networks, such as but not limited to the wireless transmitters 140a-c illustrated in the example operating environment of FIG. 1.

The network interface 205 can also include, in some implementations, an SPS receiver (also referred to as a global navigation satellite system (GNSS) receiver). The SPS receiver can be connected to the one or more antennas (not shown) for receiving satellite signals. The SPS receiver can comprise any suitable hardware and/or software for receiving and processing SPS signals. The SPS receiver can request information as appropriate from the other systems and can perform the computations necessary to determine the position of the computing device 200 using, in part, measurements obtained by any suitable SPS procedure. The positioning information received from the SPS receiver can be provided to the position determination unit 270 for determining a location of the computing device 200. The position determination unit 270 can be configured to use signals obtained from one or more terrestrial networks, such as but not limited to LTE signals from an WWAN and/or signals from one or more WLANs. The positioning determination unit 270 can be configured to use OTDOA to determine the location of the mobile device and/or other techniques depending upon the availability of signals from various terrestrial and non-terrestrial sources.

The processor(s) 210 may be connected to the memory 215, the position determination unit 270, the user interface 250, and the network interface 205. The processor may include one or more microprocessors, microcontrollers, and/or digital signal processors that provide processing functions, as well as other calculation and control functionality. The processor 210 may be coupled to storage media (e.g., memory) 215 for storing data and software instructions for executing programmed functionality within the computing device. The memory 215 may be on-board the processor 210 (e.g., within the same integrated circuit package), and/or the memory may be external memory to the processor and functionally coupled over a data bus. The memory 215 can comprise volatile memory, persistent memory, or a combination thereof.

A number of software modules and data tables may reside in memory 215 and may be utilized by the processor 210 in order to manage, create, and/or remove content from the computing device 200 and/or perform device control functionality. Furthermore, components of the high-level operating system ("HLOS") 225 of the computing device 200 may reside in the memory 215.

Assistance data 230 may also reside in the memory 215. As illustrated in FIG. 2, in some embodiments, the memory 215 may include an application module 220 which can implement one or more applications. It is to be noted that the functionality of the modules and/or data structures may be combined, separated, and/or be structured in different ways depending upon the implementation of the computing device 200. The application module 220 can comprise one or more trusted applications that can be executed by the trusted execution environment 280 of the computing device 200.

The application module 220 may be a process or thread running on the processor 210 of the computing device 200, which may request data from one or more other modules (not shown) of the computing device 200. Applications typically run within an upper layer of the software architectures and may be implemented in a rich execution environment of the computing device 200 (also referred to herein as a "user space"), and may include games, shopping applications, content streaming applications, web browsers, navigation applications, location aware service applications, etc. The application module 220 can be configured to comprise one or more applications that can be executed on the computing device 200.

The computing device 200 may further include a user interface 250 providing suitable interface systems for outputting audio and/or visual content, and for facilitating user interaction with the computing device 200. The computing device 200 may include additional user interface components, such as a keypad and/or a touchscreen for receiving user inputs, and a display (which may be separate from the touchscreen or be the touchscreen) for displaying visual content.

The position determination unit 270 provides means for performing the various example implementations discussed herein unless otherwise specified, such as the techniques illustrated in at least FIGS. 4-10. For example, the position determination unit 270 can provide the means for obtaining a coarse location of the computing device 200, means for requesting assistance data from the location server 160, means for receiving the assistance data from the location server 160, means for identifying standalone and colocated cells included in the assistance data, means for selecting one of the colocated cells from each set of colocated cells, means for obtaining measurements from the standalone and selected colocated cells, means for sending the measurements to the location server. The position determination unit 270 can also provide means for storing the assistance data received from the location server 160 in the memory 215 as the assistance data 230. The position determination unit 270 can also provide means for determining the position of the computing device 200 using signals from one or more SPS systems and/or other means for determining the position.

Figure 3:
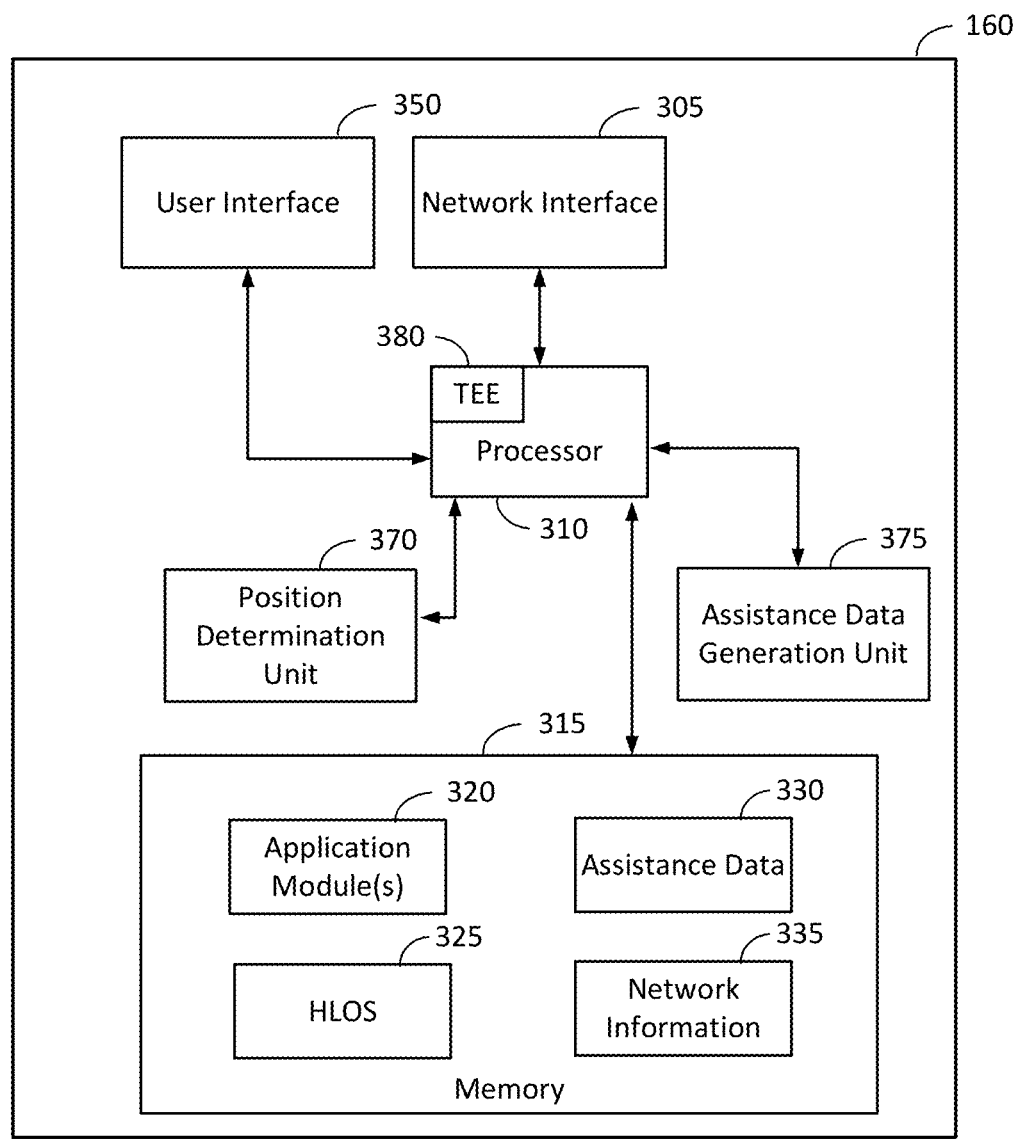
FIG. 3 is a block diagram of an example computing device that can be used to implement the location server illustrated in the preceding examples.

FIG. 3 is a functional block diagram of an example computing device 300 that can be used to implement various computing devices disclosed herein, such as the location server 160 discussed in the preceding example implementation. For the sake of simplicity, the various features/components/functions illustrated in the schematic boxes of FIG. 3 can be connected together using a common bus or are can be otherwise operatively coupled together. Other connections, mechanisms, features, functions, or the like, may be provided and adapted as necessary to operatively couple and configure a computing device 300. Furthermore, one or more of the features or functions illustrated in the example of FIG. 3 may be further subdivided, or two or more of the features or functions illustrated in FIG. 3 may be combined. Additionally, one or more of the features or functions illustrated in FIG. 3 may be excluded.

As shown, the computing device 300 can include a network interface 305 that can be configured to provide wired and/or wireless network connectivity to the computing device 300. The network interface can include one or more local area network transmitters, receivers, and/or transceivers that can be connected to one or more antennas (not shown). The one or more local area network transmitters, receivers, and/or transceivers comprise suitable devices, circuits, hardware, and/or software for communicating with and/or detecting signals to/from one or more of the wireless local area network (WLAN) access points, and/or directly with other wireless computing devices within a network. The network interface 305 can also include, in some implementations, one or more wide area network transmitters, receivers, and/or transceivers that can be connected to the one or more antennas (not shown). The wide area network transmitters, receivers, and/or transceivers can comprise suitable devices, circuits, hardware, and/or software for communicating with and/or detecting signals from one or more of, for example, the wireless wide area network (WWAN) access points and/or directly with other wireless computing devices within a network. The network interface 305 can include a wired network interface in addition to one or more of the wireless network interfaces discussed above. The network interface 305 can be used to receive data from and send data to one or more other network-enabled devices via one or more intervening networks.

The processor(s) 310 may be connected to the memory 315, the position determination unit 370, the assistance data generation unit 375, the user interface 350, and the network interface 305. The processor may include one or more microprocessors, microcontrollers, and/or digital signal processors that provide processing functions, as well as other calculation and control functionality. The processor 310 may be coupled to storage media (e.g., memory) 315 for storing data and software instructions for executing programmed functionality within the computing device. The memory 315 may be on-board the processor 310 (e.g., within the same integrated circuit package), and/or the memory may be external memory to the processor and functionally coupled over a data bus. The memory 315 can comprise volatile memory, persistent memory, or a combination thereof.

A number of software modules and data tables may reside in memory 315 and may be utilized by the processor 310 in order to manage, create, and/or remove content from the computing device 300 and/or perform device control functionality. Furthermore, components of the high-level operating system ("HLOS") 325 of the computing device 300 may reside in the memory 315. As illustrated in FIG. 3, in some embodiments, the memory 315 may include an application module 320 which can implement one or more applications. It is to be noted that the functionality of the modules and/or data structures may be combined, separated, and/or be structured in different ways depending upon the implementation of the computing device 300. The application module 320 can comprise one or more trusted applications that can be executed by the trusted execution environment 380 of the computing device 300.

The application module 320 may be a process or thread running on the processor 310 of the computing device 300, which may request data from one or more other modules (not shown) of the computing device 300. The application module 320 can comprise one or more applications that can be executed on the computing device 300.

The processor 310 can optionally include a trusted execution environment (TEE) 380. The trusted execution environment 380 can be used to implement a secure processing environment for executing secure software applications. The trusted execution environment 380 can be implemented as a secure area of the processor 310 that can be used to process and store sensitive data in an environment that is segregated from the rich execution environment in which the operating system and/or applications (such as those of the application module 320) may be executed. The trusted execution environment 380 can be configured to execute trusted applications that provide end-to-end security for sensitive data by enforcing confidentiality, integrity, and protection of the sensitive data stored therein. The trusted execution environment 380 can be used to store encryption keys, authentication information, and/or other sensitive data. The trusted applications may also be used to handle sensitive data, and/or perform other operations of a sensitive nature. In some implementations, some or all of the functionality associated with the trusted applications may be implemented by untrusted applications operating in a rich execution environment of the computing device 300. The TEE 380 can be configured to implement, at least in part, the position determination unit 370 and/or the assistance data generation unit 375. The position determination unit 370 and/or the assistance data generation unit 375 can be implemented as executable program code that is executed by the TEE 380.

The computing device 300 may further include a user interface 350 providing suitable interface systems for outputting audio and/or visual content, and for facilitating user interaction with the computing device 300. The computing device 300 may include additional user interface components, such as a keypad and/or a touchscreen for receiving user inputs, and a display (which may be separate from the touchscreen or be the touchscreen) for displaying visual content.

The position determination unit 370 can provide means for performing the various example implementations discussed herein unless otherwise specified, such as the techniques illustrated in FIGS. 11-16 and other example implementations discussed herein. The position determination unit 370 can provide various means for performing the stages of the processes illustrated in FIGS. 11-16 unless otherwise specified.

The assistance data generation unit 375 can provide means for generating assistance data according to the various techniques disclosed herein. The assistance data can be provided to the mobile device 110 to assist with OTDOA and/or other position techniques in which the mobile device 110 utilizes assistance data. The contents of the assistance data will be discussed in greater details in the examples that follow.

Figure 4:
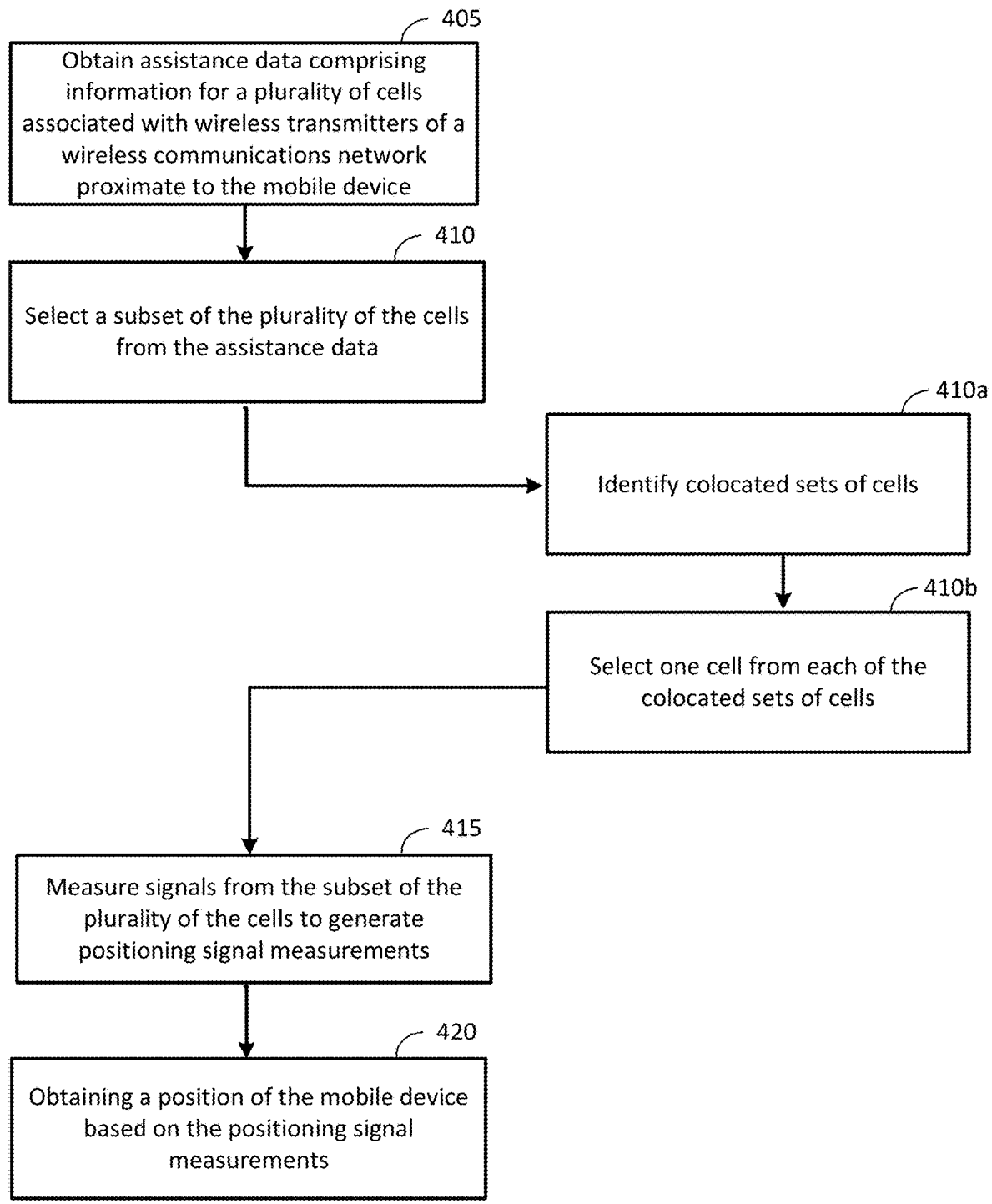
FIG. 4 is a flow diagram of an example process for determining a location of a mobile device according to the disclosure.

FIG. 4 is a flow diagram of an example process for determining a position of a mobile device according to the disclosure. The process illustrated in FIG. 4 can be implemented by the position determination unit 270 of the mobile device 110. The process illustrated in FIG. 4 can be performed in response to an application on the mobile device 110 requesting a location of the mobile device. The process in FIG. 4 can also be initiated in response to a request from another mobile device or other network-based entity requesting a location of the mobile device. In some implementations the location server 160 can initiate a positioning session with the mobile device 110 in response to a request for the position of the mobile device 110.

Assistance data can be obtained that comprises information for cells associated with a plurality of wireless transmitters of a wireless communications network (stage 405). The assistance data can be sent to the mobile device 110 by the location server 160 as part of a positioning session. In an OTDOA positioning session, the location server 160 may send a request capabilities message to the mobile device 110 to determine whether the mobile device 110 is capable of supporting OTDOA positioning prior to sending the assistance data to the mobile device 110. The send request capabilities message can include an indication as to which capabilities are required to support the OTDOA session. The mobile device 110 can respond to the location server 160 with a provide capabilities message that indicates which OTDOA modes the mobile device 110 can support, such as UE-assisted mode or UE-based mode. The provide capabilities message can also indicate which frequency bands the mobile device 110 supports for obtaining RSTD measurements and whether the mobile device 110 supports inter-frequency RSTD measurements. The location server 160 can send the assistance data over the network 125 to the mobile device 110 responsive to the provide capabilities message indicating that the mobile device 110 is capable of supporting OTDOA. While the examples disclosed herein utilized OTDOA, the techniques disclosed herein can be utilized with other positioning procedures that utilize assistance data.

The assistance data can provide information for cells associated with a plurality of wireless transmitters 140 that are proximate to the mobile device 110. The assistance data can include reference cell information identifying a particular cell as the reference cell in the OTDOA calculations. The assistance data can also include neighbor cell information identifying the neighbor cells that may be used in the OTDOA calculations. The assistance data can include Positioning Reference Signal (PRS) that identifies the PRS configuration of each of the cells included in the assistance data. The neighbor cell information can also include an expected RSTD value that specifies the RSTD value that the mobile device 110 is expected measure between the respective neighbor cell and the assistance data reference cell. The neighbor cell information can also include an expected RSTD uncertainty value that specifies an uncertainty in the RSTD value for a particular neighbor cell.

The location server 160 can select the reference cell based on a coarse location of the mobile device or on other criteria, such as selecting a current serving cell for the mobile device 110 to be the reference cell. If the provide capabilities message indicates that the mobile device 110 supports inter-frequency RSTD measurements, the location server 160 can include assistance data for up to three frequency layers according to the LTE standards.

The position determination unit 270 of the mobile device 110 can store the assistance data received from the location server 160 as the assistance data 230 in the memory 215 of the mobile device 110.

A plurality of cells in the assistance data can be selected (stage 410). The location server 160 can send a request location information message to the mobile device 110 after sending the assistance data. Receipt of this message can trigger the position determination unit 270 perform stages 410, 415, and 420. The request location information message can include a response time value that indicates how long the mobile device 110 has time to respond with RSTD measurements. The mobile device 110 can be configured to select a plurality of neighboring cells from the assistance data from which to obtain RSTD measurements. In some implementations, the position determination unit 270 of the mobile device selects all of the neighboring cells included in the assistance data even though there may be insufficient time to obtain RSTD measurements from all of the neighboring cells.

The position determination unit 270 can be configured to identify neighboring cells that are colocated at a wireless transmitter of the wireless transmitters 140, which can be an eNodeB in an LTE implementation. In some implementations, wireless transmitters from more than one carrier may be disposed at the same location, and more than one of the wireless transmitters may be a narrowband transmitter. The mobile device 110 can be configured to support the NB-IoT protocols, and the assistance data received from the location server can include a mixture of NB-IoT cells and non-narrowband cells. Some of the NB-IoT cells and the non-narrowband cells may be collocated at the same eNodeB. The colocated cells can include a NB-IoT cell and at least one non-narrowband conventional LTE cell in some implementations. The collocated cells can also include more than on NB-IoT cell at the same location, where the multiple narrowband cells are associated with different carriers. The position determination unit 270 of the mobile device 110 can be configured to preferentially select the NB-IoT standalone cells for obtaining the RSTD measurements first and can be configured to then obtain measurements from colocated cells if sufficient time remains to do so. The position determination unit 270 can be configured to select one cell from each set of colocated cells from which to obtain the RSTD measurements. Obtaining measurements from more than one colocated cell would be a waste of time as both cells are geographically located at the same point and the measurements would be redundant. Stages 410a and 410b, which can be used to implement at least in part stage 410, illustrate an example process that can be used to implement such a selection process. While the examples implementations illustrated herein are applied to colocated NB-IoT and conventional non-narrowband LTE cells and colocated NB-IoT LTE cells from multiple carriers, the techniques disclosed herein can be utilized with any types of colocated cells that may be included in assistance data that is provided by the location server 160.

Figure 9:
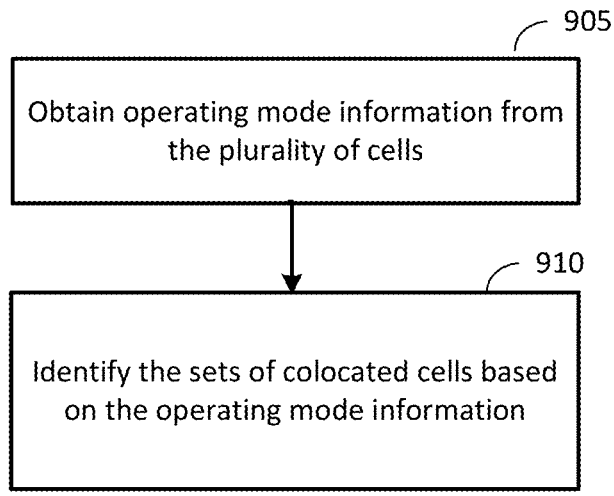
FIG. 9 is a flow diagram of an example process for identifying colocated cells according to the disclosure.

Colocated sets of cells can be identified (substage 410*a*). The position determination unit 270 can be configured to identify colocated cells. In some implementations, the position determination unit 270 can be configured to obtain operating information from the cells and to use the operating information to determine whether a cell is colocated with another cell. An example process for identifying colocated cells based on operating information broadcast by the cells is illustrated in FIG. 9. The position determination unit 270 can be configured to use other means for identifying colocated cells instead of or in addition to the technique illustrated in FIG. 9. In other implementations, the location server 160 can be configured to obtain operating mode information and to include the operating information in the assistance data provided to the mobile device 110. An example of the location server 160 obtaining operating mode information is discussed with respect to stage 1305 of the process illustrated in FIG. 13. Another example of the location server 160 obtaining operating mode information is discussed with respect to stage 1805 of the process illustrated in FIG. 19.

In some implementations, a set of colocated cells can comprise more than one narrowband cell colocated at the same location. The narrowband cells can belong to multiple carriers. The mobile device 110 may be unable to connect with or otherwise establish a communication session with a cell associated with another carrier, but the mobile device 110 may be able to measure signals from a narrowband cell associated with another carrier that can be used to determine the position of the mobile device 110. In other implementations, the mobile device 110 can be configured to connect with cells associated with multiple carriers. For example, the network interface 205 of the mobile device 110 can be configured to support LTE Dual SIM Dual Standby (DSDS) in which the mobile device 110 can be configured to utilize Subscriber Identity Modules (SIMs) from multiple carriers. The mobile device 110 can be configured to operate using the SIM from a first carrier to obtain positioning signal measurements from cells associated with the first carrier and to operate using the SIM from a second carrier to obtain positioning signal measurements from cells associated with the second carrier. The colocated cells from the first carrier and the second carrier can be narrowband or non-narrowband cells. The position determination unit 270 can identify the colocated cells identified for multiple carriers using the techniques discussed above for a single carrier by applying the identification techniques for each carrier supported by the mobile device 110.

One cell from each of the colocated sets of cells can be selected (substage 410*b*). The position determination unit 270 can be configured to select one of the colocated cells from which to obtain positioning measurements from each set of colocated cells. FIGS. 6-8 illustrate example processes that the position determination unit 270 can use to select one of the colocated cells. In some implementations, the position determination unit 270 can apply more than one of these selection processes and can select a cell from the colocated cells based on the results of the multiple selection processes. In some implementations, the position determination unit 270 can select a cell from the colocated cell that is selected the most times by the selection processes. In some implementations, the results of one or more of the selection processes may be weighted more heavily than the results of other selection processes, and the position determination unit 270 can be configured to select the cell from the colocated cells for which has a highest weighted result. The position determination unit 270 can be configured to use other selection processes in addition to or instead of the example processes illustrated in FIGS. 6-8.

Signals from the plurality of cells to generate positioning signal measurements can be measured (stage 415). The position determination unit 270 of the mobile device can obtain RSTD measurements using the wireless transceiver of the network interface 205 of the mobile device 110. The position determination unit 270 can create a list of the cells from which measurements are to be obtained in stage 410 and the position determination unit 270 can attempt to obtain measurements from each of the cells on the list before the response time specified by the location server 160 elapses. If the position determination unit 270 is unable to obtain measurements from all of the cells on the list, the position determination unit 270 can provide the RSTD measurements that were obtained to the location server 160.

Figure 5:
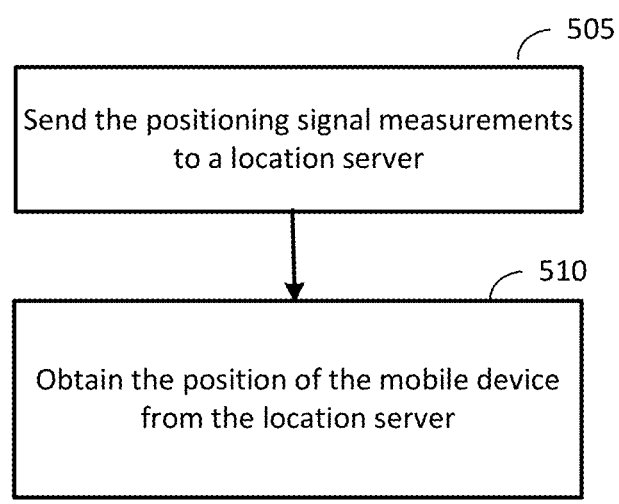
FIG. 5 is a flow diagram of an example process for determining a location of a mobile device according to the disclosure.

A position of the mobile device can be obtained based on the positioning signal measurements (stage 420). In some implementations, the location server 160 can determine the position of the mobile device 110 based on the positioning signal measurements. An example of such a process is illustrated in FIG. 5. In other implementations, the position determination unit 270 of the mobile device 110 can be configured to perform OTDOA calculations on the mobile device 110 using the positioning signal measurements to determine the position of the mobile device 110.

FIG. 5 is a flow diagram of an example process for determining a location of a mobile device according to the disclosure. The process illustrated in FIG. 5 can be implemented by the position determination unit 270 of the mobile device 110. The process illustrated in FIG. 5 can be used to implement, at least in part, stage 420 of the process illustrated in FIG. 4.

The positioning signal measurements can be sent to a location server (stage 505). The RSTD measurement obtained by the position determination unit 270 of the mobile device 110 can be sent to the location serve 160. The position determination unit 270 can send a provide location information message to the location server 160 that includes the RSTD measurement information obtained by the mobile device 110.

A position of the mobile device can be obtained from the location server (stage 510). The position of the mobile device can optionally be provided to the mobile device 110 in response to the location server 160 determining the location of the mobile device 110. If the initial request for the location of the mobile device 110 originated from another mobile device or other network entity, then the location server 160 may send the location of the mobile device 110 instead to the originator of the location request. The originator of the request may utilize the location of the mobile device 110 to provide location-based services to the mobile device 110. If the location request originated from an application on the mobile device 110, then the position determination unit 270 can be configured to provide the location received from the location server 160 to the application that originated the request. The application can be configured to provide location-based services to the mobile device 110 based on this location.

FIG. 6 is a flow diagram of an example process for selecting a colocated cell from a set of colocated cells according to the disclosure. The process illustrated in FIG. 6 can be implemented by the position determination unit 270 of the mobile device 110. The process illustrated in FIG. 6 can be used to implement, at least in part, stage 510 of the process illustrated in FIG. 5.

One cell can be selected from a colocated set of cells responsive to the one cell operating at a same frequency as a serving cell associated with the mobile device (stage 605). If one of the collocated cells is operating at a same frequency as the serving cell associated with the mobile device 110, the position determination unit 270 can be configured to select that cell from the set of colocated cells. Otherwise, if a cell is operating at a different frequency than the serving cell associated with the mobile device 110, the position determination unit 270 would be required to tune the receiver of the network interface 205 to the frequency at which the cell is operating and then tune the receiver back to the frequency at which the serving cell is operating. The position determination unit 270 would have to introduce a measurement gap each time that the receiver is tuned to a new frequency. This process can introduce delays into the measurement of the RSTD measurements, and the position determination unit 270 has a limited amount of time to obtain these measurements. Accordingly, the position determination unit 270 can be configured to select a colocated cell having a same operating frequency as the serving cell if possible.

FIG. 7 is a flow diagram of an example process for selecting a colocated cell from a set of colocated cells according to the disclosure. The process illustrated in FIG. 7 can be implemented by the position determination unit 270 of the mobile device 110. The process illustrated in FIG. 7 can be used to implement, at least in part, stage 510 of the process illustrated in FIG. 5.

One cell of a respective one of the colocated sets of cells can be selected responsive to the one cell experiencing a least amount of interference from one or more active aggressors relative to other cells of the respective one of the colocated sets of cells (stage 705). The position determination unit 270 can be configured to select a cell that is not being impacted by active aggressors. Aggressor cells can introduce strong inter-cell interference in a victim cell. The position determination unit 270 can be configured to identify such victim cells and to avoid selecting such a cell from the colocated set of cells. Aggressor cells can be determined based on the frequency of the active transmitter of the aggressor cells and the overlap that frequency and the harmonic of that frequency with allocated frequency resources associated with a victim cell. The combinations of aggressor and affective victims are static and are typically known in advance. The isolation information can also be available for the mobile device, which may be from a factory characterization of the device isolation, which can be used to determine the level of interference that the mobile device 110 may experience as a result of the aggressor cell if the mobile device is tuned to operate with a particular colocated cell that has known aggressors.

FIG. 8 is a flow diagram of an example process for selecting a colocated cell from a set of colocated cells according to the disclosure. The process illustrated in FIG. 8 can be implemented by the position determination unit 270 of the mobile device 110. The process illustrated in FIG. 8 can be used to implement, at least in part, stage 510 of the process illustrated in FIG. 5.

One cell can be selected from a colocated set of cells responsive to the one cell transmitting positioning reference signals more frequently per positioning occasion relative to other cells of the respective one of the colocated sets of cells (stage 805). The assistance data can include Positioning Reference Signal (PRS) information that identifies the PRS configuration of each of the cells included in the assistance data. The RSTD measurements obtained by the position determination unit 270 of the mobile device 110 can be made on the PRS transmitted by the reference cell and the candidate cells. The PRS is transmitted in predefined subframes that are grouped into several consecutive subframes $N_{PRS}$, which are referred to as "positioning occasions." The positioning occasions occur at a predetermined periodicity $T_{PRS}$. The $T_{PRS}$ may vary from cell to cell. For example, the $T_{PRS}$ may be selected from 160, 320, 640, and 1280 subframes or milliseconds in some implementations. The position determination unit 270 of the mobile device 110 can be configured to select a cell from the colocated cells for which the positioning occasion occurs more frequently. In some implementations, all of the colocated cells may be configured to utilize the same periodicity for the positioning occasions. The position determination unit 270 can utilize other factors, such as those in the processes illustrated in FIGS. 6 and 7 to determine which cell of the colocated cells to select.

FIG. 9 is a flow diagram of an example process for identifying colocated cells according to the disclosure. The process illustrated in FIG. 9 can be implemented by the position determination unit 270 of the mobile device 110. The process illustrated in FIG. 9 can be used to implement, at least in part, stage 505 of the process illustrated in FIG. 5.

Operating mode information can be obtained from the plurality of cells (stage 905). The operating mode information can be obtained from each of the cells as part of the Master Information Block Narrowband information (MasterInformationBlock-NB or MIB-NB) that is periodically transmitted by each of the eNodeB. In some implementations, the MasterInformationBlock-NB is transmitted every 640 milliseconds by the cell. An example of the MasterInformationBlock-NB follows:

```
MasterInformationBlock-NB ::= SEQUENCE {
    systemFrameNumber-MSB-r13    BIT STRING (SIZE (4)),
    hyperSFN-LSB-r13             BIT STRING (SIZE (2)),
    schedulingInfoSIB1-1-13      INTEGER (0..15),
    systemInfoValueTag-r13       INTEGER (0..31),
    ab-Enabled-r13               BOOLEAN,
    operationModeInfo-r13        CHOICE {
        inband-SamePCI-r13          Inband-SamePCI-NB-r13,
        inband-DifferentPCI-r13     Inband-DifferentPCI-NB-r13,
        guardband-r13               Guardband-NB-r13,
        standalone-r13              Standalone-NB-r13
    },
    spare                BIT STRING (SIZE (11))
}
Inband-SamePCI-NB-r13 ::=  SEQUENCE {
    eutra-CRS-SequenceInfo-r13    INTEGER (0..31)
}
```

The "operationModeInfo-r13" information can be used to determine whether the cell is a standalone cell or is colocated with another cell at the same eNodeB. The position determination unit 270 can be configured to determine that the cell is a standalone narrowband cell when the standalone-r13 ' field set. The position determination unit 270 can be configured to determine that the cell is colocated with another cell when the Inband-r13' is set. Where the Inband-r13' field is set, the position determination unit 270 can be configured to make a determination whether the colocated non-narrowband cell(s) are included in the assistance data received from the location server 160. The position determination unit 270 can examine the "eutra-CRS-SequenceInfo-r13" field to determine whether the narrowband cell is operating in-band with the non-narrowband LTE cell. For in-band operation, the "eutra-CRS-SequenceInfo-r13" field comprises 5 bits representing the Physical Resource Block (PRB) index of the NB-IoT cell with respect to the middle PRB of the LTE cell.

Figure 17:
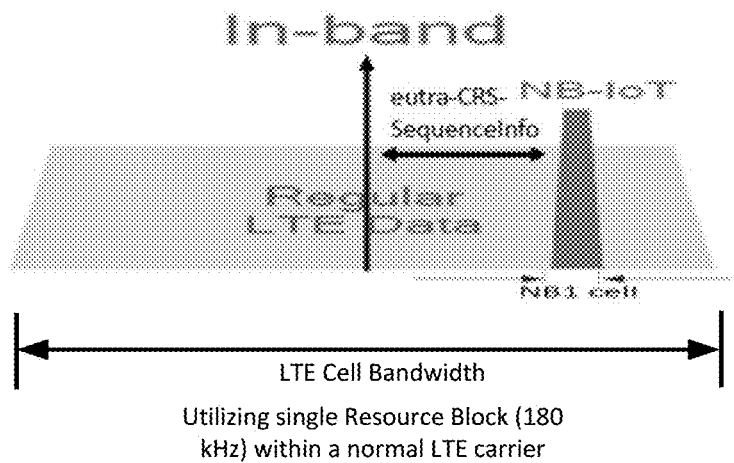
FIG. 17 is a diagram illustrating an example of an in-band NB-IoT cell colocated with a regular non-narrowband LTE cell according to the disclosure.

FIG. 17 is a diagram illustrating an example of an in-band NB-IoT cell colocated with a regular non-narrowband LTE cell. The PRB index obtained from the "eutra-CRS-SequenceInfo-r13" field represents the offset of the center frequency of the narrowband cell (labeled as "NB1 cell" in FIG. 17). The narrowband cell is allocated a subset of the bandwidth that is allocated to the non-narrowband LTE carrier. The Evolved Absolute Radio Frequency Channel Number (EARFCN) reflects the center frequency of the LTE carrier (e.g. 1.4/3/5/10/15/20 MHz carriers). The EARFCN of the colocated non-narrowband LTE cell can be determined from the NB-IoT offset information and the NB-IoT EARFCN. The position determination unit 270 can make a determination whether the LTE non-NB cell is present in the assistance data. If both the NB-IoT cell and the colocated non-NB cell are both present in the assistance data, the position determination unit 270 can select either the NB-IoT cell or the non-NB cell as a candidate from which to obtain RSTD measurements. The non-selected cell can be ignored, and no measurements are taken from the ignored cell since that cell is essentially a duplicate of the selected cell for positioning purposes. Both cells are located at the same geographic location. No benefit is incurred by measuring signals from both colocated cells. Obtaining RSTD measurements from only one of the colocated cells can save both time and power.

Sets of colocated cells can be identified based on the operating mode information (stage 910). The position determination unit 270 can be configured to identify the colocated cells using at least the techniques discussed above. The position determination unit 270 can be configured to select one of the colocated cells using one or more of the processes illustrated in FIGS. 6-8.

Figure 10:
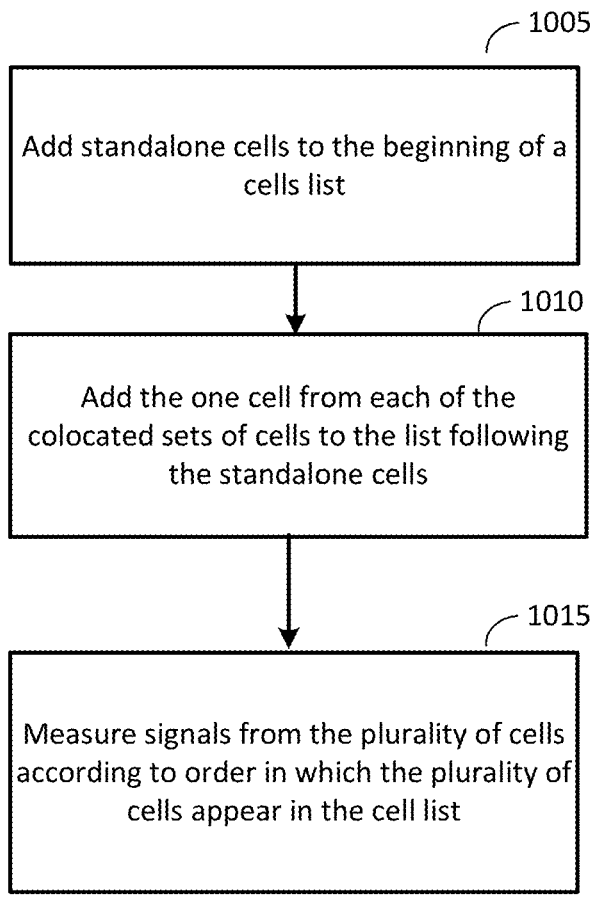
FIG. 10 is a flow diagram of an example process for identifying colocated cells according to the disclosure.

FIG. 10 is a flow diagram of an example process for building a list of cells from which positioning measurements are to be obtained according to the disclosure. The process illustrated in FIG. 10 can be implemented by the position determination unit 270 of the mobile device 110. The process illustrated in FIG. 10 can be used to implement, at least in part, stage 510 of the process illustrated in FIG. 5.

Standalone cells can be added to the beginning of a cells list (stage 1005). Standalone cells can be added to the beginning of the cells list that will be used by the position determination unit 270 of the mobile device 110 when obtaining the RSTD measurements. The standalone cells in some implementation may be NB-IoT cells. However, the techniques disclose herein are not limited to colocated narrowband and non-narrowband cells.

The selected one cell from each of the colocated sets of cells can be added to the list following the standalone cells (stage 1010). The position determination unit 270 can add the selected cell from each of the colocated sets of cells to the list following the standalone cells. The position determination unit 270 will attempt to obtain RSTD measurements from these cells after obtaining measurements from the standalone cells.

Signals can be measured from the plurality of cells in the list according to the order in which the plurality of cells appear in the cell list (stage 1015). The position determination unit 270 can be configured to obtain RSTD measurements from each of the cells in the cells list. The location server 160 can specify to the mobile device 110 a response time that indicates how long the mobile device 110 can spend obtaining the RSTD measurements. If the response time elapses before measurements can be obtained from the entire list, then the measurements that have been obtained will be sent to the location server 160. The position determination unit 270 will try to obtain the measurements from the standalone cells first. The standalone cells may be NB-IoT cells as in the various example implementations discussed herein.

Figure 11:
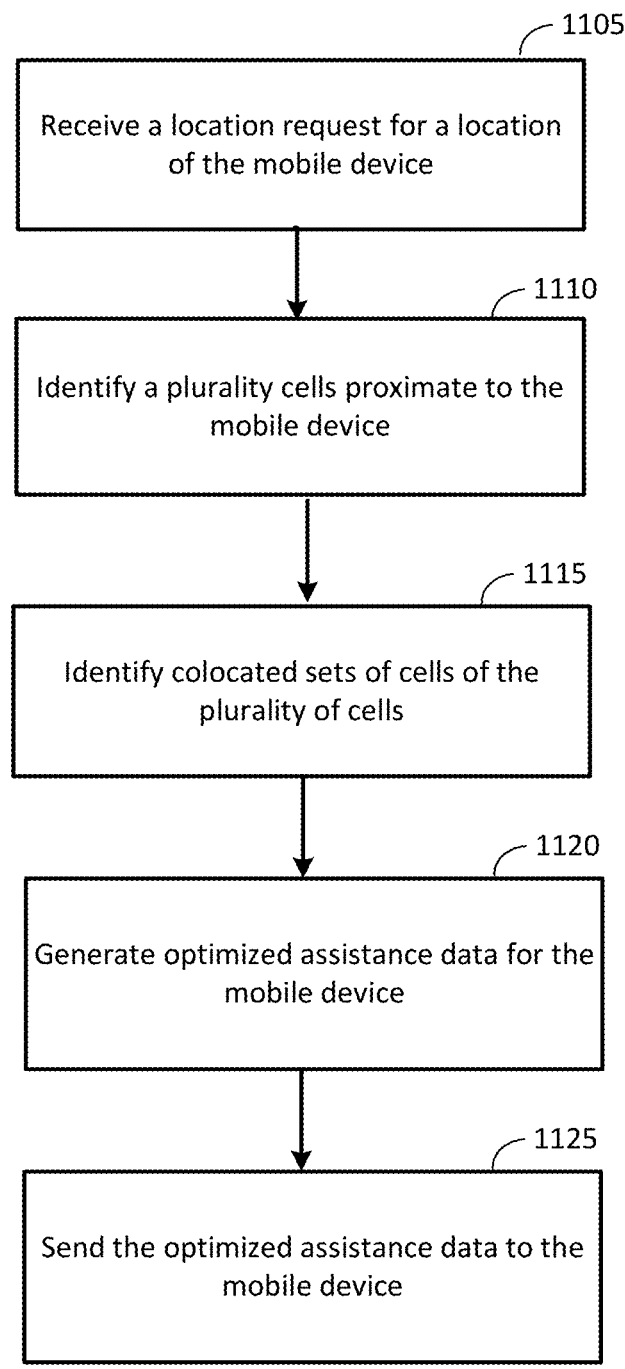
FIG. 11 is a flow diagram of an example process for generating assistance data for determining a location of a mobile device according to the disclosure.

FIG. 11 is a flow diagram of an example process for generating assistance data for determining a location of a mobile device according to the disclosure. The process illustrated in FIG. 11 can be implemented by the position determination unit 370 and the assistance data generation unit 375 of the location server 160.

A location request for a location of a mobile device can be received (stage 1105). The location request can include a coarse location of the mobile device 110 in some implementation or the coarse location of the mobile device can be determined by the network. The location request can originate from the mobile device 110, another mobile device, or another network entity, such as but not limited to a GMLC. The GMLC is configured to support location-based services (LB S) and can provide an access point for LBS clients to access location information from the network.

A plurality of cells proximate to the mobile device can be identified (stage 1110). The coarse location of the mobile device 110 can be used to identify a plurality of neighboring cells that are located proximate to the coarse location of the mobile device 110. The position determination unit 370 can be configured to identify one cell to serve as a reference cell and a plurality of cells to serve as neighboring cells for the purposes of OTDOA measurements. The current serving cell of the mobile device 110 can be selected by the position determination unit 370 as the reference cell to be included in the assistance data. The neighboring cells can be selected as discussed below and the added to the assistance data in an order in which the mobile device 110 should attempt to obtain positioning signal measurements from the cells.

Figure 13:
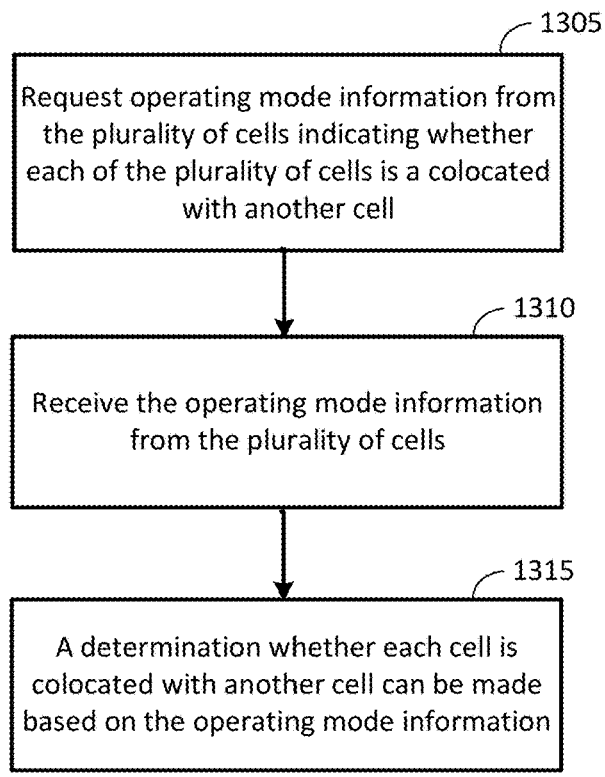
FIG. 13 is a flow diagram of an example process for identifying colocated cells according to the disclosure.
Figure 19:
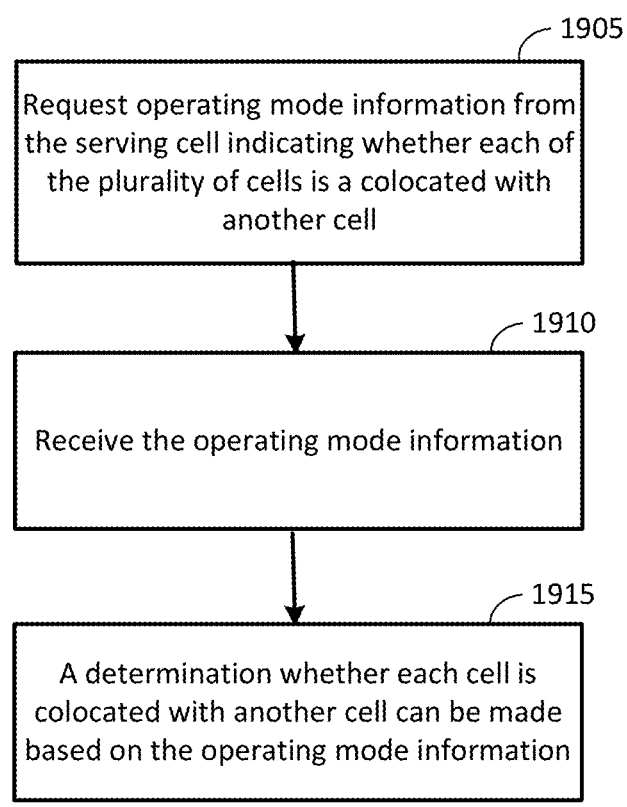
FIG. 19 is a flow diagram of an example process for identifying colocated cells according to the disclosure.

Colocated sets of cells of the plurality of cells can be identified (stage 1115). The position determination unit 370 of the location server 160 can be configured to obtain operating information from the plurality of cells proximate to the mobile device 110 in order to determine whether the cells are colocated with another cell. Example processes for determining whether a cell is colocated with another cell are illustrated in FIGS. 13 and 19. The colocated cells can disposed at the same eNodeB. In some implementations, the colocated cells can comprise an NB-IoT cell and at least one non-narrowband LTE cell.

Figure 18:
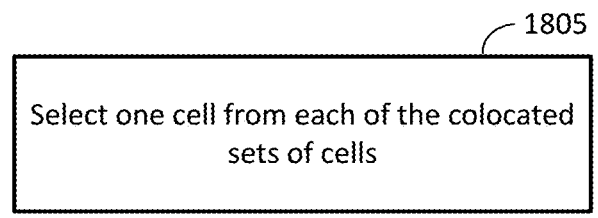
FIG. 18 is a flow diagram of an example process for selecting a colocated cell from a set of colocated cells according to the disclosure.

Optimized assistance data can be generated for the mobile device (stage 1125). In some implementations, the optimized assistance data can include one cell from each of the colocated set of cells and standalone cells from the plurality of cells. The position determination unit 370 of the location server 160 can be configured to select just one of the colocated cells for each of the sets of colocated cells and to include that selected cells in the assistance data. FIG. 18 illustrates an example of such a process in which only one of the cells of each of the colocated cells is selected. In other implementations, the position determination unit 370 can be configured to include all of the colocated cells and can include the operating mode information for those cells in the assistance data. The mobile device 110 can make a determination as to which of the colocated cells to select in such implementations, such as in stage 510 of the process illustrated in FIG. 5. In stage 505 of the process of FIG. 5, the mobile device 110 can be configured to identify the colocated sets of cells based on the operating mode information included in the assistance data.

The position determination unit 370 can provide information regarding the cells to be included in the assistance data to the assistance data generation unit 375. The position determination unit 370 can provide information for the standalone and selected colocated cells where the location server 160 is configured to select which colocated cells to used. Otherwise, all of the cells can be included in the assistance data along with any operating mode information associated with those cells. The assistance data generation unit 375 can be configured to format the information according to the wireless communications protocols being utilized by the mobile device 110 and the location server 160. The assistance data generation unit 375 can be configured to store a copy of the assistance data that has been generated as assistance data 330 in the memory 315 of the location server 160. The assistance data generation unit 375 can access the network information 335 to obtain information about the cells included in the assistance data.

The assistance data generation unit 375 can be configured to prioritize the standalone cells at the beginning of a cells list included in the assistance data. The standalone cells can be added to the beginning of the cells list included in the assistance data can be used by the position determination unit 270 of the mobile device 110 when obtaining the RSTD measurements. The standalone cells in some implementation may be NB-IoT cells. However, the techniques disclose herein are not limited to colocated narrowband and non-narrowband cells. The assistance data generation unit 375 can add the selected cell from each of the colocated sets of cells to the cell list following the standalone cells. The position determination unit 270 of the mobile device 110 will attempt to obtain RSTD measurements from these cells after obtaining measurements from the standalone cells. In the network-based implementation discussed herein, the assistance data includes only one of the colocated cells, and the mobile device 110 does not need to identify colocated cells included in the assistance data (such as in the example process illustrated in FIG. 4).

In some implementations, the mobile device 110 can be configured to operate with multiple carriers. For example, the mobile device 110 can be configured to support LTE DSDS and can include SIM cards from more than one carrier. In such implementations, the mobile device 110 can be configured to receive optimized assistance data from location servers 160 associated with multiple carriers. However, the optimized assistance data from the multiple location servers may include colocated cells, because a first carrier may not have location information for the cells associated with other carriers. The position determination unit 270 of the mobile device can be configured to identify the colocated cells included in the assistance data provided by the location servers and to select a single colocated cell from the colocated cells from which to obtain positioning measurements.

Figure 12:
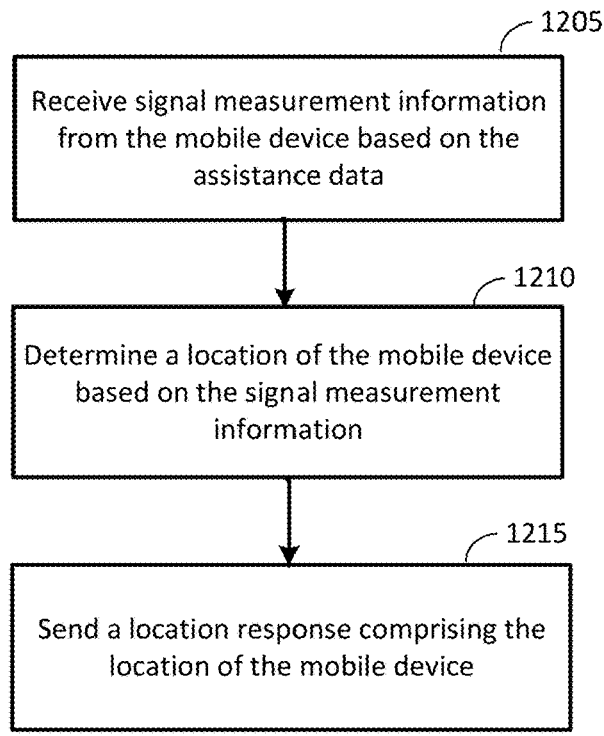
FIG. 12 is a flow diagram of an example process for generating assistance data for determining a location of a mobile device according to the disclosure.

FIG. 12 is a flow diagram of an example process for generating assistance data for determining a location of a mobile device according to the disclosure. The process illustrated in FIG. 12 can be implemented by the position determination unit 370 and the assistance data generation unit 375 of the location server 160. The process illustrated in FIG. 12 can be used to implement additional stages of the process illustrated in FIG. 11.

Positioning signal measurement information can be received from the mobile device (stage 1205). The positioning signal measurement information can be obtained by the mobile device 110 based on the assistance data provided to the mobile device 110 by the location server 160. The signal measurements can include RSTD measurements used for ODTOA positioning.

A location of the mobile device can be determined based on the signal measurement information (stage 1210). The position determination unit 270 can use the RSTD measurements to perform ODTOA positioning according to conventional OTDOA techniques. The position of the mobile device 110 at the time that measurements were obtained can be determined.

A location response comprising a location of the mobile device can be sent (stage 1215). The position determination unit 270 can be configured to send a location response to the entity that sent the location request message. The location response can include a location of the mobile device 110 as determined by the location server 160. The location response may also include an estimated accuracy of the location.

FIG. 13 is a flow diagram of an example process for identifying colocated cells according to the disclosure. The process illustrated in FIG. 13 can be implemented by the position determination unit 370 and the assistance data generation unit 375 of the location server 160. The process illustrated in FIG. 13 can be used to implement, at least in part, stage 1115 of the process illustrated in FIG. 11.

Operating mode information can be requested from a plurality of cells indicating whether each of the plurality of cells is collocated with another cell (stage 1305). The location server 160 can be configured to request operating mode information from each of the plurality of cells. The location server 160 can be configured to implement the LTE Provisioning Protocol Annex (LPPa) which consists of Elementary Procedures (EPs) that are units of interaction between the location server 160 and an eNodeB. The LPPa EPs include an OTDOA Information Exchange that facilitates the OTDOA positioning. In some implementations, LPPa can be extended to implement an additional EP that enables the location server 160 to request operating information for each cell from the eNodeB. The EP can be referred to as an Operating Information Exchange.

Operating mode information can be received from the plurality of cells (stage 1310). The location server 160 can receive operating information from the plurality of cells. The information can include, at least in part, operating information similar to that which the mobile device 110 is able to obtain from the MIB-NB discussed above. In some implementations, the operating mode information obtained from the plurality of cells can be included in the assistance data that the location server 160 provides to the mobile device 110.

A determination whether a particular cell is colocated with another cell can be made based on the operating mode information (stage 1315). The location server 160 can determine based on the operating mode information whether a particular cell is a standalone cell or is colocated with another cell. A standalone cell may be an NB-IoT cell and some NB-IoT cells may be colocated with a standard non-NB LTE cell as discussed in the preceding examples.

Figure 14:
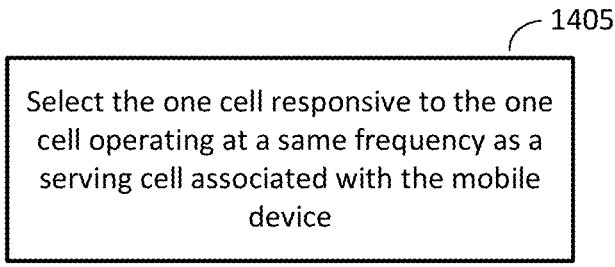
FIG. 14 is a flow diagram of an example process for selecting a colocated cell from a set of colocated cells according to the disclosure.

FIG. 14 is a flow diagram of an example process for selecting a colocated cell from a set of colocated cells according to the disclosure. The process illustrated in FIG. 14 can be implemented by the position determination unit 370 of the location server 160. The process illustrated in FIG. 14 can be used to implement, at least in part, stage 1805 of the process illustrated in FIG. 18.

One cell can be selected from a colocated set of cells responsive to the one cell operating at a same frequency as a serving cell associated with the mobile device (stage 1405). If one of the collocated cells is operating at a same frequency as the serving cell associated with the mobile device 110, the position determination unit 370 of the location server 160 can be configured to select that cell from the set of colocated cells. Otherwise, if a cell is operating at a different frequency than the serving cell associated with the mobile device 110, the position determination unit 270 of the mobile device 110 would be required to tune the receiver of the network interface 205 to the frequency at which the cell is operating and then tune the receiver back to the frequency at which the serving cell is operating. The position determination unit 270 would have to introduce a measurement gap each time that the receiver is tuned to a new frequency. This process can introduce delays into the measurement of the RSTD measurements, and the position determination unit 270 of the mobile device 110 has a limited amount of time to obtain these measurements. Accordingly, the position determination unit 370 of the location server 160 can be configured to select a colocated cell having a same operating frequency as the serving cell (if possible) for inclusion in the assistance data.

Figure 15:
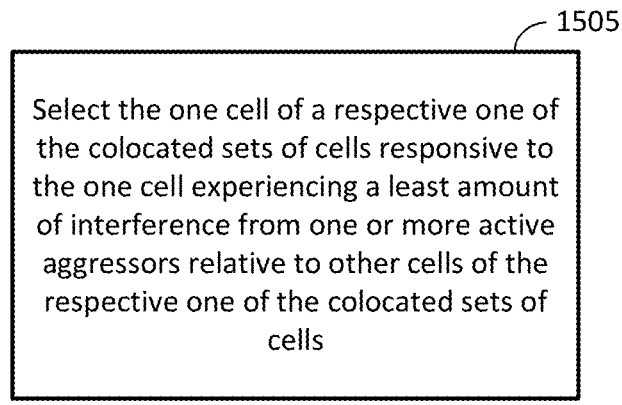
FIG. 15 is a flow diagram of an example process for selecting a colocated cell from a set of colocated cells according to the disclosure.

FIG. 15 is a flow diagram of an example process for selecting a colocated cell from a set of colocated cells according to the disclosure. The process illustrated in FIG. 15 can be implemented by the position determination unit 370 of the location server 160. The process illustrated in FIG. 15 can be used to implement, at least in part, stage 1805 of the process illustrated in FIG. 18.

One cell of a respective one of the colocated sets of cells can be selected responsive to the one cell experiencing a least amount of interference from one or more active aggressors relative to other cells of the respective one of the colocated sets of cells (stage 1505). The position determination unit 370 can be configured to select a cell that is not being impacted by active aggressors for inclusion in the assistance data. Aggressor cells can introduce strong inter-cell interference in a victim cell. The position determination unit 370 can be configured to identify such victim cells and to avoid selecting such a cell from the colocated set of cells.

Figure 16:
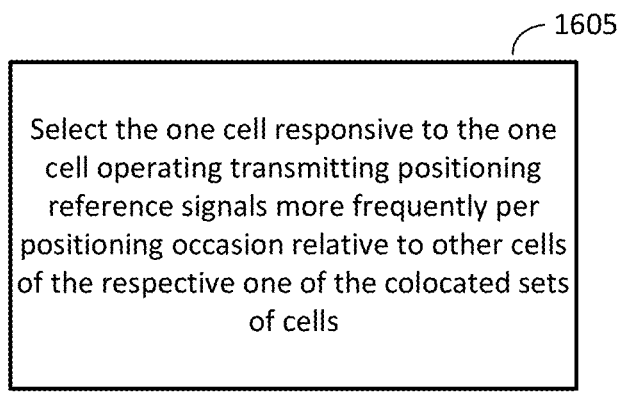
FIG. 16 is a flow diagram of an example process for selecting a colocated cell from a set of colocated cells according to the disclosure.

FIG. 16 is a flow diagram of an example process for selecting a colocated cell from a set of colocated cells according to the disclosure. The process illustrated in FIG. 16 can be implemented by the position determination unit 370 of the location server 160. The process illustrated in FIG. 16 can be used to implement, at least in part, stage 1805 of the process illustrated in FIG. 18.

One cell can be selected from a colocated set of cells responsive to the one cell transmitting positioning reference signals more frequently per positioning occasion relative to other cells of the respective one of the colocated sets of cells (stage 1605). The assistance data can include Positioning Reference Signal (PRS) information that identifies the PRS configuration of each of the cells included in the assistance data. The RSTD measurements obtained by the position determination unit 270 of the mobile device 110 can be made on the PRS transmitted by the reference cell and the candidate cells. The PRS is transmitted in predefined subframes that are grouped into several consecutive subframes $N_{PRS}$, which are referred to as "positioning occasions." The positioning occasions occur at a predetermined periodicity $T_{PRS}$. The $T_{PRS}$ may vary from cell to cell. For example, the $T_{PRS}$ may be selected from 160, 320, 640, and 1280 subframes or milliseconds in some implementations. The position determination unit 270 of the mobile device 110 can be configured to select a cell from the colocated cells for which the positioning occasion occurs more frequently. In some implementations, all of the colocated cells may be configured to utilize the same periodicity for the positioning occasions. The position determination unit 370 can utilize other factors, such as those in the processes illustrated in FIGS. 14 and 15 to determine which cell of the colocated cells to select for inclusion in the assistance data.

FIG. 18 is a flow diagram of an example process for selecting a colocated cell from a set of colocated cells according to the disclosure. The process illustrated in FIG. 18 can be implemented by the position determination unit 370 of the location server 160. The process illustrated in FIG. 18 can be used to implement, at least in part, stage 1120 of the process illustrated in FIG. 11 by selecting just one of each set of colocated cells to be included in the assistance data provided to the mobile device 110 by the location server 160.

One cell from each of the colocated sets of cells can be selected (stage 1805). The position determination unit 370 can be configured to select one of the colocated cells from which to obtain positioning measurements from each set of colocated cells. FIGS. 14-16 illustrate example processes that the position determination unit 370 can use to select one of the colocated cells. In some implementations, the position determination unit 370 can apply more than one of these selection processes and can select a cell from the colocated cells based on the results of the multiple selection processes. In some implementations, the position determination unit 370 can select a cell from the colocated cell that is selected the most times in the results of multiple selection processes. In some implementations, the results of one or more of the selection processes may be weighted more heavily than the results of other selection processes, and the position determination unit 370 can be configured to select the cell from the colocated cells for which has a highest weighted result. The position determination unit 370 can be configured to use other selection processes in addition to or instead of the example processes illustrated in FIGS. 14-16.

FIG. 19 is a flow diagram of an example process for identifying colocated cells according to the disclosure. The process illustrated in FIG. 19 can be implemented by the position determination unit 370 and the assistance data generation unit 375 of the location server 160. The process illustrated in FIG. 19 can be used to implement, at least in part, stage 1115 of the process illustrated in FIG. 11.

Operating mode information can be requested from the serving cell associated with the mobile device (stage 1905). The location server 160 can be configured to request from the serving cell operating mode information for each of the plurality of cells, and the serving cell can be configured to obtain the operating information from the core network. The core network can maintain a database that includes operating mode information for each of the cells of the network. The core network can query the database to obtain the operating mode information for the plurality of cells for which operating mode information is requested.

Operating mode information can be received for the plurality of cells (stage 1910). The location server 160 can receive operating information for the plurality of cells. The information may be provided by the serving cell, one or more other network entities, or both. The information can include, at least in part, operating information similar to that which the mobile device 110 is able to obtain from the MIB-NB discussed above. In some implementations, the operating mode information obtained from the plurality of cells can be included in the assistance data that the location server 160 provides to the mobile device 110.

A determination whether a particular cell is colocated with another cell can be made based on the operating mode information (stage 1915). The location server 160 can determine based on the operating mode information whether a particular cell is a standalone cell or is colocated with another cell. A standalone cell may be an NB-IoT cell and some NB-IoT cells may be colocated with a standard non-NB LTE cell as discussed in the preceding examples.

Some example implementations according to the disclosure include:

1. An example computing device comprising:
    means for receiving a location request for a location of a mobile device;
    means for identifying a plurality cells proximate to the mobile device;
    means for generating optimized assistance data for the mobile device; and
    means for sending the optimized assistance data to the mobile device.
2. The computing device of example 1, wherein the location request comprises a coarse location for the mobile device.
3. The computing device of example 1, further comprising:
    means for determining the coarse location of the mobile device responsive to receiving the location request.
4. The computing device of example 1, further comprising:
    means for receiving signal measurement information from the mobile device based on the assistance data;
    means for determining a location of the mobile device based on the signal measurement information; and
    means for sending a location response comprising the location of the mobile device.
5. The computing device of example 1, wherein the means for generating the optimized assistance data for the mobile device further comprises:
    means for identifying colocated sets of cells of the plurality of cells; and
    means for selecting one cell from each of the colocated sets of cells.
6. The computing device of example 5, further comprising:
    means for adding the selected one transmitter from each of the colocated set of cells and standalone cells from the plurality of cells to the assistance data.
7. The computing device of example 5, wherein the means for identifying the colocated sets of cells further comprises:
    means for requesting operating mode information from the plurality of cells indicating whether each of the plurality of cells is colocated with another cell; and
    means for receiving the operating mode information from the plurality of cells.
8. The computing device of example 7, wherein the means for requesting the operating mode information from the plurality of cells further comprises:
    means for requesting the operating mode information using a Long-Term Evolution (LTE) Positioning Protocol (LPPa) function for obtaining operating mode information.
9. The computing device of example 5, wherein the means for identifying the colocated sets of cells further comprises:
    means for requesting operating mode information from a serving cell; and
    means for receiving the operating mode information from the serving cell, one or more other network elements, or both.
10. The computing device of example 5, wherein the means for selecting the one cell from each of the colocated sets of cells further comprises:
    means for selecting the one cell responsive to the one cell operating at a same frequency as a serving cell associated with the mobile device.
11. The computing device of example 5, wherein the means for selecting the one cell from each of the colocated sets of cells further comprises:
    means for selecting the one cell of a respective one of the colocated sets of cells responsive to the one cell experiencing a least amount of interference from one or more active aggressors relative to other cells of the respective one of the colocated sets of cells.
12. The computing device of example 5, wherein selecting the one cell from each of the colocated sets of cells further comprises:
    means for selecting the one cell responsive to the one cell transmitting positioning reference signals more frequently per positioning occasion relative to other cells of the respective one of the colocated sets of cells.
13. The computing device of example 5, wherein a colocated set of cells comprises a narrowband cell and a non-narrowband cell.
14. The computing device of example 13, wherein the narrowband cell comprises a narrowband Internet of Things (NB-IoT) cell and the non-narrowband cell comprises a non-narrowband cell colocated with the NB-IoT cell at an Evolved Node B (eNodeB).
15. An example non-transitory, computer-readable medium, having stored thereon computer-readable instructions for determining a position of a mobile device, comprising instructions configured to cause a computing device to:
    receive a location request for a location of the mobile device;
    identify a plurality cells proximate to the mobile device;
    generate optimized assistance data for the mobile device; and
    send the optimized assistance data to the mobile device.
16. The non-transitory, computer-readable medium of example 14, wherein the location request comprises a coarse location for the mobile device.
17. The non-transitory, computer-readable medium of example 15, further comprising instructions configured to cause the computing device to:
    determine the coarse location of the mobile device responsive to receiving the location request.
18. The non-transitory, computer-readable medium of example 15, further comprising instructions configured to cause the computing device to:
    receive signal measurement information from the mobile device based on the assistance data;
    determine a location of the mobile device based on the signal measurement information; and
    send a location response comprising the location of the mobile device.
19. The non-transitory, computer-readable medium of example 15, wherein the instructions configured to cause the computing device to generate the optimized assistance data for the mobile device further comprise instructions configured to cause the computing device to:
    identify colocated sets of cells of the plurality of cells; and
    select one cell from each of the colocated sets of cells.
20. The non-transitory, computer-readable medium of example 19, further comprising instructions configured to cause the computing device to:

add the selected one transmitter from each of the colocated set of cells and standalone cells from the plurality of cells to the assistance data.

21. The non-transitory, computer-readable medium of example 19, wherein the instructions configured to cause the computing device to identify the colocated sets of cells further comprise instructions configured to cause the computing device to:
request operating mode information from the plurality of cells indicating whether each of the plurality of cells is colocated with another cell; and
receive the operating mode information from the plurality of cells.

22. The non-transitory, computer-readable medium of example 21, wherein the instructions configured to cause the computing device to request the operating mode information from the plurality of cells further comprise instructions configured to cause the computing device to:
request the operating mode using a Long-Term Evolution (LTE) Positioning Protocol (LPPa) function for obtaining operating mode information.

23. The non-transitory, computer-readable medium of example 19, wherein the instructions configured to cause the computing device to identify the colocated sets of cells further comprise instructions configured to cause the computing device to:
request operating mode information from a serving cell; and
receive the operating mode information from the serving cell, one or more other network elements, or both.

24. The non-transitory, computer-readable medium of example 19, wherein the instructions configured to cause the computing device to select the one cell from each of the colocated sets of cells further comprise instructions configured to cause the computing device to:
select the one cell responsive to the one cell operating at a same frequency as a serving cell associated with the mobile device.

25. The non-transitory, computer-readable medium of example 19, wherein the instructions configured to cause the computing device to select the one cell from each of the colocated sets of cells further comprise instructions configured to cause the computing device to:
select the one cell of a respective one of the colocated sets of cells responsive to the one cell experiencing a least amount of interference from one or more active aggressors relative to other cells of the respective one of the colocated sets of cells.

26. The non-transitory, computer-readable medium of example 19, wherein the instructions configured to cause the computing device to select the one cell from each of the colocated sets of cells further comprise instructions configured to cause the computing device to:
select the one cell responsive to the one cell transmitting positioning reference signals more frequently per positioning occasion relative to other cells of the respective one of the colocated sets of cells.

27. The non-transitory, computer-readable medium of example 19, wherein a colocated set of cells comprises a narrowband cell and a non-narrowband cell.

28. The non-transitory, computer-readable medium of example 27, wherein the narrowband cell comprises a narrowband Internet of Things (NB-IoT) cell and the non-narrowband cell comprises a non-narrowband cell colocated with the NB-IoT cell at an Evolved Node B (eNodeB).

29. An example mobile device configured to:
means for obtaining assistance data comprising information for a plurality of cells associated with wireless transmitters of a wireless communications network proximate to the mobile device;
means for selecting a subset of the plurality of the cells from the assistance data, wherein the means for selecting the subset of the plurality of the cells comprises:
means for identifying colocated sets of cells; and
means for selecting one cell from each of the colocated sets of cells;
means for measuring signals from the subset of the plurality of the cells to generate positioning signal measurements; and
means for obtaining a position of the mobile device based on the positioning signal measurements.

30. The mobile device of claim 29, wherein the means for obtaining a position of the mobile device based on the positioning signal measurements further comprise:
means for sending the positioning signal measurements to a location server; and
means for obtaining a position of the mobile device from the location server.

31. The mobile device of claim 29, wherein a colocated set of cells comprises a narrowband cell and a non-narrowband cell or two narrowband cells.

32. The mobile device of claim 31, wherein the narrowband cell comprises a narrowband Internet of Things (NB-IoT) cell and the non-narrowband cell is colocated with the NB-IoT cell at an Evolved Node B (eNodeB).

33. An example non-transitory, computer-readable medium, having stored thereon computer-readable instructions for determining a position of a mobile device, comprising instructions configured to cause the mobile device to:
obtain assistance data comprising information for a plurality of cells associated with wireless transmitters of a wireless communications network proximate to the mobile device;
select a subset of the plurality of the cells from the assistance data, wherein the instructions configured to cause the mobile device to select the subset of the plurality of the cells comprise instructions configured to cause the mobile device to:
identify colocated sets of cells; and
select one cell from each of the colocated sets of cells;
measure signals from the subset of the plurality of the cells to generate positioning signal measurements; and
obtain a location of the mobile device based on the positioning signal measurements.

34. The non-transitory, computer-readable medium of example 33, wherein the instructions configured to cause the mobile device to obtain the position of the mobile device based on the positioning signal measurements further comprise instructions configured to cause the mobile device to:
send the positioning signal measurements to a location server; and
obtain the position of the mobile device from the location server.

35. The non-transitory, computer-readable medium of example 33, wherein a colocated set of cells comprises a narrowband cell and a non-narrowband cell.

36. The non-transitory, computer-readable medium of example 31, wherein the narrowband cell comprises a narrowband Internet of Things (NB-IoT) cell and the non-narrowband cell is colocated with the NB-IoT cell at an Evolved Node B (eNodeB).

If implemented in-part by hardware or firmware along with software, the functions can be stored as one or more instructions or code on a computer-readable medium. Examples include computer-readable media encoded with a data structure and computer-readable media encoded with a computer program. Computer-readable media includes physical computer storage media. A storage medium can be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±30% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±30% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and can be based on one or more items and/or conditions in addition to the stated item or condition.

What is claimed is:

1. A method for determining a position of a mobile device, the method comprising:
    obtaining assistance data comprising information for a plurality of cells associated with wireless transmitters of a wireless communications network proximate to the mobile device;
    selecting a subset of the plurality of the cells from the assistance data, wherein selecting the subset of the plurality of the cells comprises:
        identifying, as being colocated, one or more colocated sets of cells from the plurality of cells based on operating mode information from the subset of the plurality of the cells from the assistance data; and
        selecting only one cell from each of the one or more colocated sets of cells to be included in the subset of the plurality of the cells;
    measuring signals from the subset of the plurality of the cells to generate positioning signal measurements; and
    obtaining a position of the mobile device based on the positioning signal measurements.

2. The method of claim 1, wherein obtaining the position of the mobile device further comprises:
    sending the positioning signal measurements to a location server; and
    obtaining the position of the mobile device from the location server.

3. The method of claim 1, wherein at least one of the one or more colocated set of cells comprises a narrowband cell and a non-narrowband cell or two narrowband cells.

4. The method of claim 3, wherein the narrowband cell comprises a narrowband Internet of Things (NB-IoT) cell and the non-narrowband cell is colocated with the NB-IoT cell at an Evolved Node B (eNodeB).

5. The method of claim 1, wherein selecting only the one cell from each of the one or more colocated sets of cells further comprises:
    selecting the one cell responsive to the one cell operating at a same frequency as a serving cell associated with the mobile device.

6. The method of claim 1, wherein selecting only the one cell from each of the one or more colocated sets of cells further comprises:
    selecting the one cell of a respective one of the one or more colocated sets of cells responsive to the one cell experiencing a least amount of interference from one or more active aggressors relative to one or more other cells of the respective one of the one or more colocated sets of cells.

7. The method of claim 1, wherein selecting only the one cell from each of the one or more colocated sets of cells further comprises:
    selecting the one cell of a respective one of the one or more colocated sets of cells responsive to the one cell transmitting positioning reference signals more frequently per positioning occasion relative to one or more other cells of the respective one of the one or more colocated sets of cells.

8. The method of claim 1, wherein the operating mode information comprises a Master Information Block transmitted by each cell of the plurality of cells.

9. The method of claim 1, wherein the operating mode information is included in the assistance data received from the location server.

10. The method of claim 1, further comprising generating a cell list by:
    adding standalone cells to the beginning of the cell list; and
    adding the one cell from each of the one or more colocated sets of cells to the cell list following the standalone cells.

11. The method of claim 10, wherein measuring the signals from the subset of the plurality of the cells to generate the positioning signal measurements further comprises:
    measuring the signals from the subset of the plurality of the cells according to an order in which the subset of the plurality of the cells appear in the cell list.

12. A mobile device comprising:
    a transceiver for sending a receiving data wirelessly;
    a memory; and
    a processor communicatively coupled to the transceiver and the memory, the processor configured to:

obtain assistance data comprising information for a plurality of cells associated with wireless transmitters of a wireless communications network proximate to the mobile device;

select a subset of the plurality of the cells from the assistance data, wherein the processor is further configured to:

identify, as being colocated, one or more colocated sets of cells from the plurality of cells based on operating mode information from the subset of the plurality of the cells from the assistance data; and select only one cell from each of the one or more colocated sets of cells to be included in the subset of the plurality of the cells;

measure signals from the subset of the plurality of the cells to generate positioning signal measurements; and obtain a position of the mobile device based on the positioning signal measurements.

13. The mobile device of claim 12, wherein the processor is further configured to:

send the positioning signal measurements to a location server; and obtain a position of the mobile device from the location server.

14. The mobile device of claim 12, wherein to select only the one cell from each of the one or more colocated sets of cells the processor is configured to select the one cell responsive to the one cell transmitting positioning reference signals more frequently per positioning occasion relative to one or more other cells of the respective one of the one or more colocated sets of cells.

* * * * *